United States Patent
Huang et al.

(10) Patent No.: US 7,092,867 B2
(45) Date of Patent: Aug. 15, 2006

(54) CONTROL SYSTEM ARCHITECTURE FOR A MULTI-COMPONENT ARMAMENT SYSTEM

(75) Inventors: Paul C. Huang, Circle Pines, MN (US); Omar A. Khan, Minneapolis, MN (US); Albert Sleder, Jr., Eagan, MN (US)

(73) Assignee: BAE Systems Land & Armaments L.P., Arlington, VA (US)

(*) Notice: Subject to any disclaimer, the term of this patent is extended or adjusted under 35 U.S.C. 154(b) by 810 days.

(21) Appl. No.: 09/740,102

(22) Filed: Dec. 18, 2000

(65) Prior Publication Data

US 2002/0078138 A1  Jun. 20, 2002

(51) Int. Cl.
G06F 13/10 (2006.01)

(52) U.S. Cl. .............. 703/21; 703/13; 703/23; 703/24; 701/1; 701/3

(58) Field of Classification Search ............ 703/6, 703/8; 434/29; 235/400
See application file for complete search history.

(56) References Cited

U.S. PATENT DOCUMENTS

| | | | |
|---|---|---|---|
| 3,701,206 A * | 10/1972 | Ormiston | 434/12 |
| 3,880,043 A * | 4/1975 | Cox et al. | 89/1.56 |
| 4,004,729 A | 1/1977 | Rawicz et al. | |
| 4,825,151 A | 4/1989 | Aspelin | |
| 5,034,686 A | 7/1991 | Aspelin | |
| 5,036,466 A * | 7/1991 | Fitzgerald et al. | 235/400 |
| 5,201,658 A | 4/1993 | Taylor et al. | |
| 5,229,538 A * | 7/1993 | McGlynn et al. | 89/1.56 |
| 5,235,127 A | 8/1993 | Findley | |
| 5,305,221 A | 4/1994 | Atherton | |
| 5,511,218 A | 4/1996 | Castelaz | |
| 5,528,503 A | 6/1996 | Moore et al. | |
| 5,551,875 A | 9/1996 | Shaffer et al. | |
| 5,614,896 A * | 3/1997 | Monk et al. | 340/945 |
| 5,682,066 A | 10/1997 | Perry et al. | |
| 5,807,109 A * | 9/1998 | Tzidon et al. | 434/35 |
| 5,838,262 A | 11/1998 | Kershner et al. | |
| 5,992,290 A * | 11/1999 | Quebedeaux et al. | 89/1.56 |
| 6,053,736 A * | 4/2000 | Huffman et al. | 434/11 |
| 6,067,851 A | 5/2000 | Chaves et al. | |
| 6,106,298 A * | 8/2000 | Pollak | 434/29 |
| 6,298,318 B1 * | 10/2001 | Lin | 703/23 |
| 6,360,193 B1 * | 3/2002 | Stoyen | 703/17 |
| 6,684,182 B1 * | 1/2004 | Gold et al. | 703/8 |
| 2002/0142267 A1 * | 10/2002 | Perry | 434/11 |
| 2003/0033059 A1 * | 2/2003 | Ebert et al. | 701/3 |

OTHER PUBLICATIONS

"INCOSE Insight", International Council on Systems Engineering, Issue 13, Fall 1996.*

(Continued)

*Primary Examiner*—Fred Ferris
(74) *Attorney, Agent, or Firm*—Patterson, Thuente, Skaar & Christensen, P.A.

(57) ABSTRACT

The present invention is a Control System Architecture (CSA) for a multi-component armament system. The CSA provides dynamic reconfiguration of multiple nodes (e.g. a component, a subsystem, or a virtual simulation) in a Simulation-Emulation-Stimulation (SES) environment utilizing redundant client-server bus configuration of the nodes in a hierarchical model. The CSA provides for ease of configuration of nodes for any specific application, automated system reconfiguration capabilities to detect and bypass failed nodes or re-group available remaining nodes in the event of degraded mode operation, and expansion and/or downsizing of nodes without requiring a modification to the overall system architecture.

17 Claims, 22 Drawing Sheets

OTHER PUBLICATIONS

"Electronic Warfare Test and Evaluation Process", Air Force Manual 99-112, Mar. 27, 1995.*
"Absolute Beginners Guide to Networking", M. Gibbs, pp. 55, 56, 92, 93, 166, 399, 438, 1995 Sams Publishing.*
"How the Internet Works", P. Gralla, ISBN: 0-7897-2132-5, Que 1999.*
"Communications networks for the Force XXI digitized Battlefield", Sass, Mobile Networks and Applications 4, 1999.*
"Network-Centric Warfare: Impact On Army Operations", Stein et al, IEEE 0-7803-632, IEEE 2000.*
*System Integration Laboratory—A New Approach to Software/Electronics System Integration*, Paul Huang, Pradip Kar, 6th Annual International Council on Systems Engineering Symposium, 6 pgs., Jun. 7, 1996.
H613 United States Statutory Invention Registration: *Portable Shipboard Gunnery Training/Diagnostic Apparatus*, Samuel L. Stello, James M. Johnson, J. Harold Jones, Published Apr. 4, 1989.
*Modeling and Simulation Based System Integration Approach*, Paul Huang, Pradip Kar, 7th Annual International Council on Systems Engineering Symposium, 9 pgs., Aug. 7, 1997.
*Using Modeling and Simulation for Rapid Prototyping and System Integration*, Paul Huang, Pradip Kar, Chad Frandrich, IEEE International Conference on Systems, MAN and Cybernetics, 6 pgs., Oct. 12, 1997.
*Simulation-Emulation-Stimulation A Complete System Engineering Process*, Paul Huang, Pradip Kar, Al Sleder , Hiroko Kato, 8th Annual International Council on Systems Engineering Symposium, 7 pgs.; Jul. 27, 1998.
*System Simulation Based Engineering Process*, Paul Huang, Al Sleder, Hiroko Kato, Bruce Eidenschink, IEEE International Conference on Intelligent Engineering Systems, 6 pgs., Sep. 17, 1998.
*System Design Using Virtual Prototyping Techniques*, Paul Huang, Pradip Kar, Al Sleder, Bruce Eidenschink, IEEE International Conference on Systems, MAN and Cybernetics, 6 pgs., Oct. 12, 1998.
*Study Results: The Use of Virtual Environments for Product Design*, G.M. Bochenek, J.M. Ragusa, IEEE International Conference on Systems, Man and Cybernetics, vol. 2, pp. 1250-1253, Oct. 1998.
*Integration and Demonstration of a Distributed Computer for Vehicle Control*, J.M. Iaconis, J.N. Callen, IEEE Conference on Intelligent Transportation Systems, pp. 379-384, Nov. 1997.
*Fire Control Architecture Modeling and Animation*, N. Coleman, R. May, P. Yip, C. Lin, X. Feng, Z. Zhou, Proceedings of the American Control Conference, pp. 1764-1768, Jun. 1999.
*Digital Command and Control System Soldier-Machine Interface for Ground Combat Systems*, D. Mariani, 3rd Symposium on Human Interaction with Complex Systems, pp. 20-27, Aug. 1996.
*An Open Simulation Architecture for Force XXI*, J.A. Hamilton, Jr., U.W. Pooch, Winter Simulation Conference, pp. 1296-1303, 1995.
*Communications Networks for the Force XXI Digitized Battlefield*, P. Sass, Mobile Networks and Applications, pp. 139-155, 1999.
*SOAR/IFOR: Intelligent Agents for Air Simulation and Control*, P.E. Nielsen, Winter Simulation Conference, pp. 620-625, 1995.

* cited by examiner

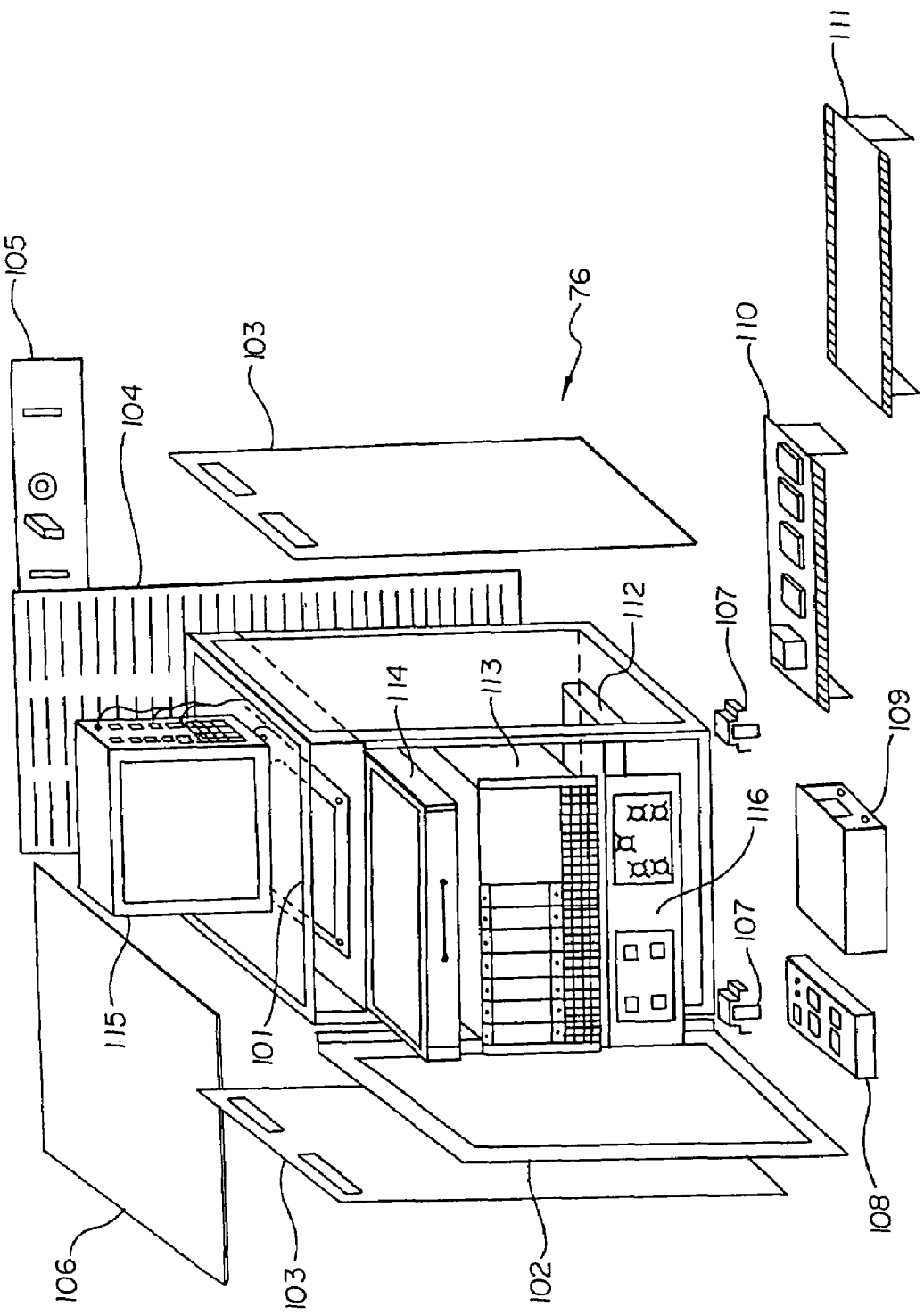

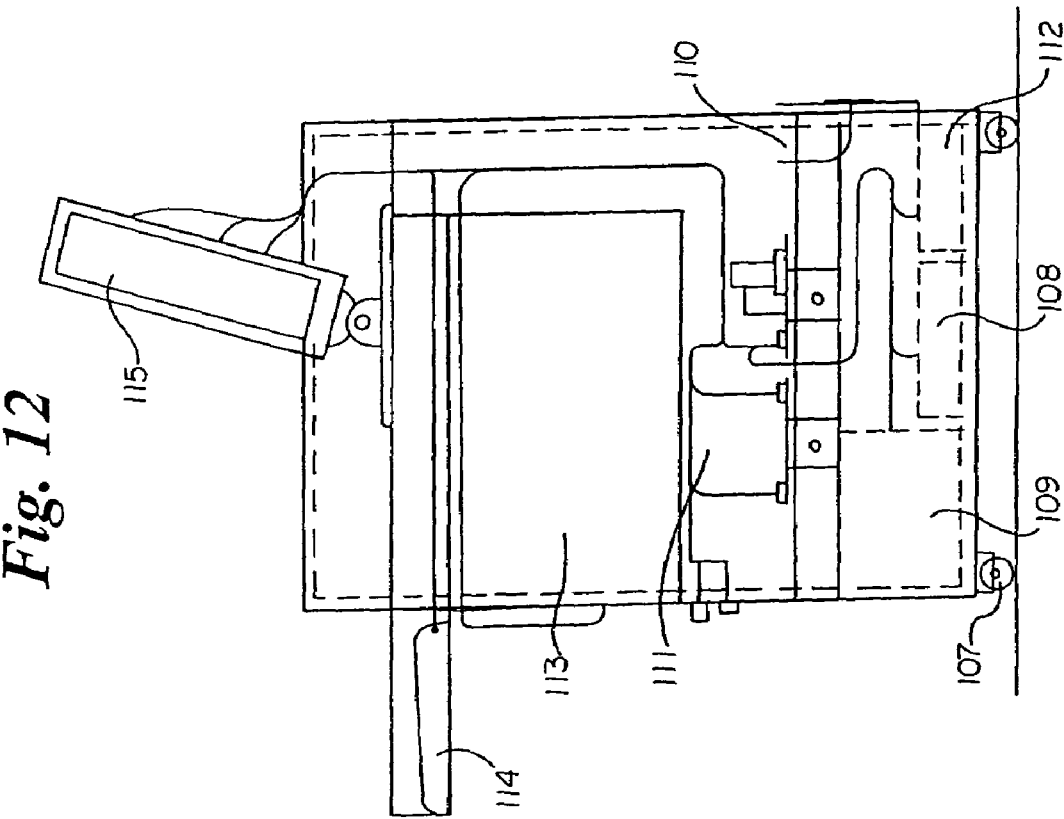
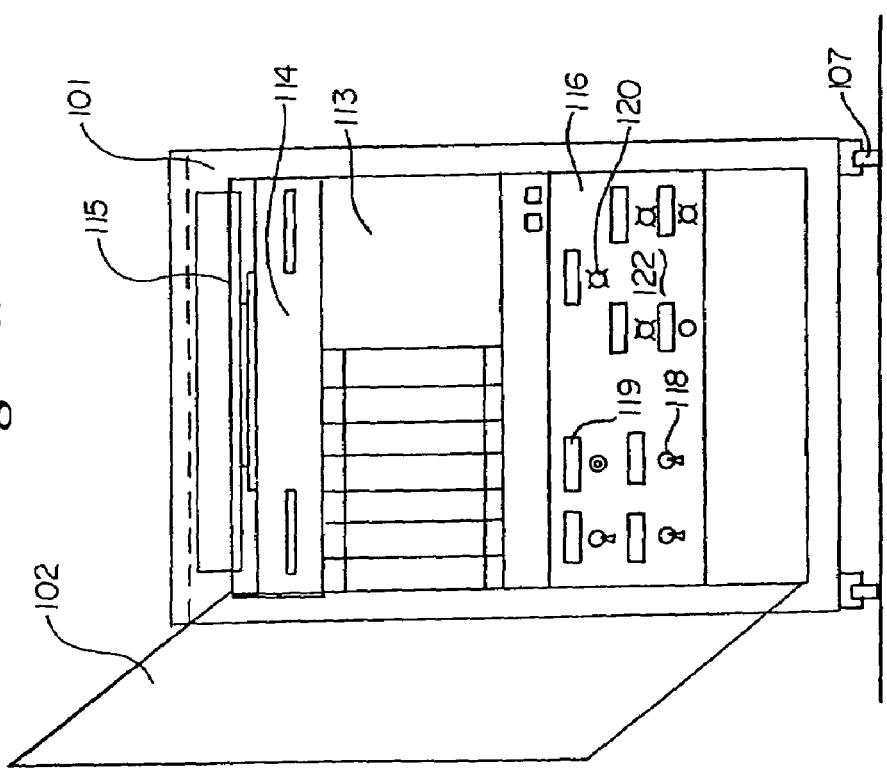

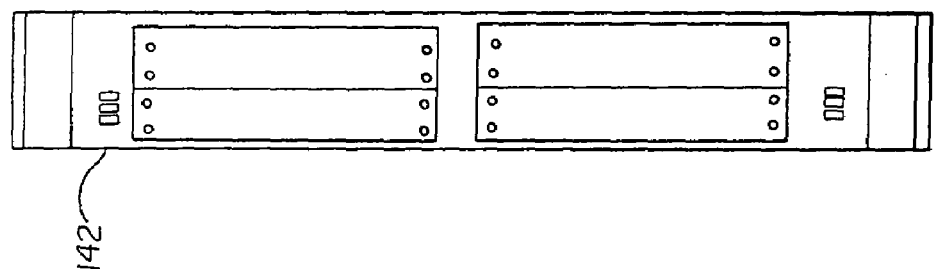
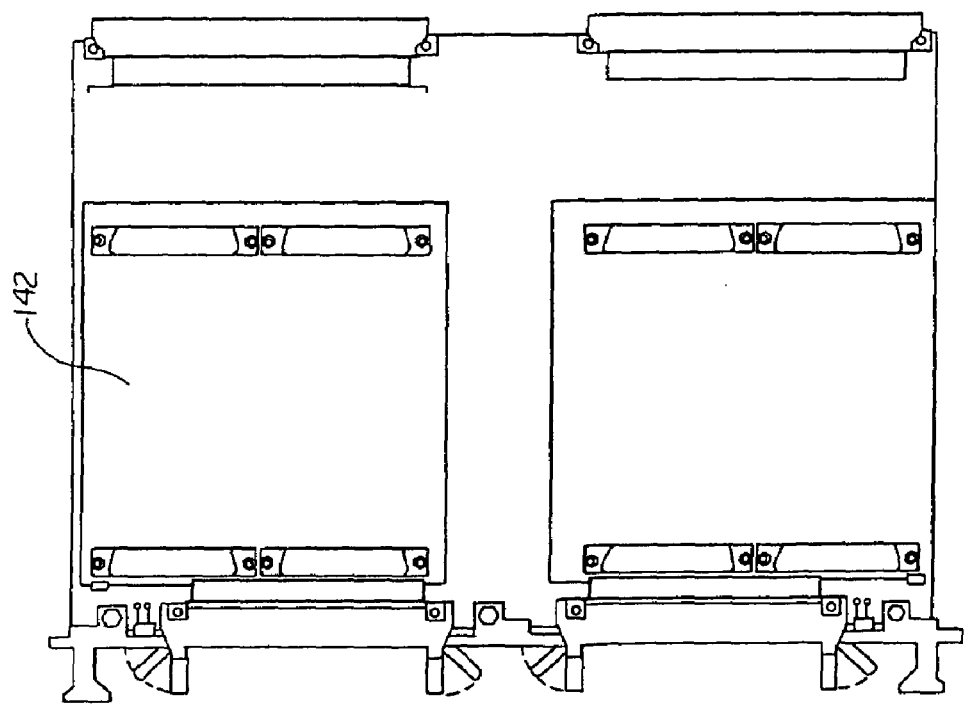

CONTROL SYSTEM ARCHITECTURE FOR A MULTI-COMPONENT ARMAMENT SYSTEM

FIELD OF THE INVENTION

The present invention relates to multi-component armament or weaponry systems. More particularly, the present invention relates to a robust control system architecture for simulation and control of multi-component armament systems.

BACKGROUND OF THE INVENTION

Modern armament systems for military applications are increasingly complex. Typically, there are a plurality of disparate components that are controlled by a complex control system, which coordinates and integrates the operation of each component in the system.

In the early stages of evolution, armament control systems were merely a series of mechanical mechanisms that allowed an operator to activate a particular component using the judgment of the operator. One such example is the mechanical linkage for weapons release on early military aircraft. When the pilot determined the plane was at the correct location, the pilot would actuate a particular linkage from the cockpit, thereby releasing the related weapon. With the advent of electronic control systems, the remote release of a particular weapon component controlled by such a system became possible. An electronic switch in the cockpit of the military aircraft would send a signal through dedicated wiring to a weapon actuator, thereby releasing a particular weapon.

The next stage in the evolution of armament systems was the integration of computer control into the armament system. Targeting control computers were combined with data acquired from sources such as radar systems to aide the operator in target acquisition, thereby improving on-target percentages. U.S. Pat. No. 4,004,729 is an example of such a system that provides an automated fire control apparatus. The control system of this patent connects a radar tracking system with a targeting computer and weapon positioning means. The computer control system provides a larger period of time during which the weapon may be successfully fired at the intended target.

As computer systems became more powerful, it became more common to centralize the control functions in a single armament control system that could manage multiple diverse armament components. U.S. Pat. No. 5,229,538 is an example of one type of centralized armament control system. This patent provides a digital communications armament system for controlling a carriage of "smart" weapons. The smart weapons are carried by the aircraft in a Multiple Carriage Rack (MCR). The weapons in the MCR are programmed and controllably released as part of a weapons control system. The components of this system are communicably interconnected by a single databus as described in MIL-STD-1553. The military standard 1553 bus is a dual redundant bus comprising two shielded twisted pair cables, a bus controller, and a plurality of remote terminals.

U.S. Pat. No. 5,036,466 is another example of a centralized armament control system. This provides a central control unit that also is communicably connected by a MIL-STD-1553 bus to multiple armament components. The system further interacts with the operator by the inclusion of graphical user interfaces (GUI's), which are typically video display screens. The GUI's allow the operator to monitor system status and actuate desired system functions. All of the components are connected by a single common bus to a central bus controller. The central bus controller directs the flow of information along the bus between the central controller and the various components.

As armament control systems have evolved over time, the engineering processes used to develop these increasingly complex systems have undergone corresponding evolutions. Not long ago, engineers would brainstorm solutions to problems in their minds and transfer them to paper by hand. These drawings could then be used by fabricators to construct prototypes. The prototypes were then field tested to determine whether that particular design met the problem criteria. If the prototype did not acceptably solve the problem, modifications were made or new ideas were tried. This involved repeating the steps of brainstorming, drafting, fabrication, and testing. This "trial and error" process was iterative in nature and proved to be both lengthy and labor intensive.

The application of computers to the conventional design process has brought about several improvements. Computer drafting programs created a cost savings by streamlining the drawing step through minimizing the time it took a draftsperson to prepare drawings and modify the drawings in subsequent design process iterations. With the advent of Computer-Aided Engineering (CAE) tools, the design process could be further streamlined by minimizing the amount of iterations that needed to be performed before a satisfactory solution was obtained. CAE tools permit engineers to perform modeling and simulation of specific tasks performed by the system. Through modeling and simulation, many unacceptable solutions to the problem can be eliminated without the need to fabricate expensive prototypes or undertake lengthy and costly testing.

The resulting streamlined engineering process produces satisfactory results for a majority of engineering applications. However, this process cannot provide a smooth and efficient flow for the development of multi-component armament systems. In a multi-component armament system, there can be at least several different subsystems that are typically developed concurrently by different engineering teams. This type of parallel development, while compressing the time needed for the development cycle, creates communication difficulties between different development teams. The different subsystems ultimately must be combined with one another in the design process as part of an integration process step. During integration, the different subcomponents are combined as a complete multi-component armament unit that is then tested as a completed system. It is typical that the completed system must undergo a series of modifications in order to debug problems that arise during the integration testing process. The additional steps of integration and testing of the overall system, when individual subsystems have already been tested, adds length and cost to the development process.

The assignee of the present invention has developed a Simulation-Emulation-Stimulation (SES) process that streamlines the complex development process for integrated multi-component weaponry systems. The SES process addresses the communication issue by creating a virtual armament simulation system that each development team can use to simulate the characteristics of the complete system during the development of a particular subsystem, thereby minimizing or eliminating problems that may be encountered during integration and testing. The virtual armament simulation system includes a virtual prototype of each subsystem. The virtual prototypes simulate the characteristics of each subsystem. Each team can then develop their particular subsystem within the simulation of a real world installation. As with other types of existing control systems, components of the virtual armament SES system and the virtual prototypes are linked in communication by different communication channels, for example, a single MIL-STD 1553 bus or an Ethernet link. A more detailed description of the SES process is provided by, Huang, et al. in, "System Integration Laboratory—A New Approach to Software/Electronics System Integration" (1996). The paper describes a modeling and simulation based development and integration approach adopted for the Bradley Fighting Vehicle (BFV) M2A3 Engineering and Manufacturing Development (EMD) program at United Defense LP. The paper describes BFV A3 Upgrades, which were primarily in the area of fire control, electronics and software, and reports the development of a multi-purpose real-time simulation/ emulation/stimulation (SES) and the system integration effort involved for the BFV A3 program. An SES was utilized to support system definition in the early stages and integration in later stages. A System Integration Laboratory (SIL) facilitated SES development. The SIL also provided the facilities and equipment for the overall system integration process.

During the system definition stage, the SES provided high fidelity modeling/simulation support to help define and characterize the system performance requirements, the system architecture, system sizing and timing, and interface implementation schemes between subsystems. During the integration phase the SES provided a lab integration environment with test sets, data reduction and acquisition capabilities, software upload/download and processor emulation facilities on tactical hardware; and stimulators to enable systematic testing and integration of subsystems. The SES, all target hardware and software units and subsystems, power supplies and ancillaries were accommodated in the System Integration Laboratory (SIL).

The integration tasks of the BFV A3 system involved the physical and functional connection of two electro-optical sights, an advanced fire control subsystem, a stabilized gun mount, a communications subsystem, an electronic warfare subsystem, power system, and other supporting subsystems. Most of the subsystems were equipped with processors and embedded software. The completed BFV A3 system was controlled by a turret processor unit. The system used point-to-point connections and a MIL-STD-1553 B databus to link all the subsystems to perform the combat mission. Like many major military electronic systems, the BFV A3 system had redundancy for the major components and the system was capable of performing in a degraded mode when it experiences non-fatal damage.

The paper describes computer simulation techniques in the context of computer-aided engineering (CAE) and comments on how the computer simulations can be run in real-time at a reasonable cost. One of the benefits of running simulations in real-time, according to the authors, is that it enables the interaction between simulation units to be in the form of live signals (i.e., with the same electrical characteristics as the end item). In other words, the simulations can emulate subsystems. This emulation capability expands the scope of simulation significantly. Further, with real-time simulation and emulation capability, engineers can construct stimulators to supply either the emulator or real systems with needed excitation that is similar to a field operation in a lab environment. These artificial excitations are indistinguishable from the real signals. This simulation, emulation, and stimulation (SES) provides a very powerful tool for the modern engineering process.

The paper goes on to describe the SES tool for the BFV A3 System integration tasks that was developed within the United Defense Systems Integration Laboratory (SIL). The SES development was started concurrently with system definition. Initially, the System Segment Specification was used to develop a relatively rudimentary but complete system simulation: the High Level System Simulation (HLSM), to understand the overall system characteristics early in the program and support system definition. As the design progressed, the simulation model was refined to reflect the new design. The HLSM evolved to the emulation model later to resolve issues on interfaces and communication. Eventually, a System. Integration Environment (SIE) was created. This SIE consisted of simulation models created by CAE tools, emulation software and hardware, and stimulators. The simulated counterparts of line replaceable units (LRUs) and subsystems, developed by third parties, were integrated into the SIE after initial laboratory acceptance tests, and tested extensively using this SIE to resolve performance and interface problems. Finally, the simulated counterpart was replaced by the actual LRU or subsystem in the reconfigured SIE to perform system level integration tests within the SIL.

Rapid prototyping methodology was used to create an overall system simulation before starting subsystem design. Conceptual emulation and stimulation were created using the same methodology. A rapid prototype provides an early working model of the system. This model provides an indication of system behavior and information essential for system definition. Alternative implementation schemes can be prototyped and performance characteristics obtained to support trade studies. Many technical issues associated with a complex system such as interfaces, throughput of processors, bandwidth of communication, interactions among subsystems, and soldier machine interfaces can be resolved through rapid prototyping.

In the BFV A3 Program, the MatrixX SystemBuild CAE tool (supplied by Integrated Systems Inc., (ISI)) was selected. Using this CAE tool, analysts and engineers can generate simulation models using building blocks supplied by the tool set. Simulation development consists of defining block diagrams of the system using rules defined by the tool. The tool then converts it into a simulation model, and hence the conventional equation generation and coding is streamlined into merely plotting the system block diagram. Tedious and time-consuming program debugging is replaced by accurately representing system behavior in the block diagrams.

The constructed simulation models were tested and analyzed in a powerful engineering workstation. The completed simulation models were then autocoded to generate the source code automatically. This automatically generated code was compiled and downloaded to a specific simulation controller. The simulation controller was a software and hardware system that allowed the source code of the simulation to run in real-time. A salient feature of the simulation controller was that specially constructed software/hardware interfaces could reside in the same chassis as the processor (s) to perform simulation. In the rapid prototype, the communication between the subsystems and components were looped through the special interface hardware/software. In this manner, the communications within the rapid prototype had the same functional and electronic characteristics as the completed system. The issues and problems associated with integration could be isolated and identified easily using this simulation controller. The solution candidates could be generated and tested within a fraction of the time required for conventional re-design, fabrication, and test.

The purpose of rapid prototyping was to construct an overall system model early in the program to assist system definition, assess many system issues and to better understand the integration problem. It was used to assist subsystem design and pave the way for successful system integration. During the program the constructed rapid prototypes (or SES) were constantly enhanced and refined to reflect the current design. The SES reflected the design in both function and structure. It allowed the models to be built separately. A special feature of the integration approach adopted, was the incremental integration environment. The constructed rapid prototype had many placeholders. Each line replaceable unit (LRU) or subsystem model occupied a unique placeholder within the SES. In the early stage of the program, the placeholders were filled by rudimentary simulation models of the LRUs and subsystems that could roughly simulate the functions of the BFV A3 system. This was used to formulate the system concept and assist the subsystem definition. As the design gradually progressed, those placeholders were replaced by more detailed and sophisticated LRU and subsystem models. Finally, when the actual LRUs and subsystems became available, the LRUs and subsystems replaced the simulation models one at a time, in the placeholder that resides in the overall integration environment. The corresponding placeholders allowed for appropriate software "plugs" to connect to the software/hardware interfaces, and through appropriate adapters, directly connected to the LRUs and subsystems due to early compliance to interface definition documents.

For the overall lab environment, there was almost no difference between this LRU or subsystem and the replaced simulation model. Using this approach, the tactical components (LRUs and subsystems) could be integrated one at a time into the overall system laboratory setup.

The first major program at United Defense that used a SIL was the Advanced Field Artillery System (AFAS) Advance Technology Demonstration Program. On this program, the new approach was used for a part of the system: the gun drives. On the AFAS ATD program the process was developed and perfected so that it could be used to develop the entire system for the BFV A3 program. During different phases of the program the configuration and functions of the SES equipment could evolve. In the long run, the easy reconfiguration and quick turn over of rapid prototyping can save substantial cost in system development due to the advantage of being able to identify potential problems and issues before commencement of design, and resolving them before detailed design, resulting in substantial overall savings compared with conventional approaches.

The significance of the BFV A3 System is that this was the first UDLP program that used rapid prototyping on a system that depended on a MIL-STD-1553 B databus for major communications. (emphasis not in original). The authors recognized that simulation can give rise to issues such as numerical region of stability and algebraic loops, to name a few. A second publication, Huang et al., "Modeling and Simulation (M&S) Based System Integration Approach"(1997), reports results of using the approach described in the previous paper through the delivery of the first prototype vehicle including, a seamless integration process, fault insertion capability, and software integration aid. This paper describes the use of M&S from early system development through test and evaluation and life cycle support. They also report on enhancements to the simulation (now called the Bradley Plus simulator or BPS) which will extend its usefulness. M&S was used from day one as a system engineering tool to validate the system specification. During design stage it was used as a design tool to aid the design process and tradeoffs. During system integration, M&S was used to accept and test the components and subsystems. The BFV A3 system engineering effort involved the definition and integration of many software and hardware subsystems, including two new electro-optical sights; new IFF (Identification Friend or Foe); an electronic warfare subsystem; new computers, fire control software and communications subsystems; and a new digital system architecture.

In order for M&S to be effective on the Bradley A3, it had to be ready on time to support the development process. To minimize the impact of the unpredictable and labor-intensive manually developed model software, off-the-shelf Computer Aided Engineering (CAE) tools were studied, analyzed, and selected. The CAE tools provided the modelers the capability to develop models rapidly and with relative ease. Labor intensive analysis, design and coding used in the development of conventional simulation models were discarded. Tedious and error-prone coding and debugging were replaced by automatic code generation and pictorial debugging tools.

Initially, the System Segment Specification was used to develop a relatively rudimentary but complete system simulation: the High Level System Simulation (HLSIM), to understand the overall system characteristics early in the program and support system definition. HLSIM included a program executive that controlled the system simulation, a set of place holders that contained the subsystems' and components' simulation models in the same configuration as the design, and a set of graphical user interfaces (GUI). The GUIs were constructed using the software tool sets and widgets. They gave near realistic views for visual understanding. The GUIs also served as user-friendly user input/output devices. As the design progressed, the simulation model was refined to reflect the new design. Special interfaces for software and hardware were constructed. The emulation model was produced using the infrastructure of HLSIM.

The interface signals originated from the same simulation models. The simulated signals were sent to specially built communication software blocks called user code blocks (UCBs). Outputs from the UCBs were used to drive interface hardware. The interface hardware was modified commercial off the shelf (COTS) circuit cards. These COTS cards, processor cards, wires, connectors, harness, and CAE tool generated simulation models comprised the overall M&S environment.

Using the easy to manipulate M&S environment, minimal effort was needed to build the communication UCBs. The communication protocols were identical to the tactical units and device drivers were equivalent commercial versions. Another salient feature of using this approach was that it allowed the real-time SES to take the advantage of any existing software/hardware prototypes or tactical units, that were available and at a later date, test sets. Whenever a subsystem or line replaceable unit (LRU) became available, the M&S environment would allow it to be plugged into the overall M&S environment to replace the corresponding simulation model. After the emulation was completed, it was also possible to generate all required external signals. Special build software models, in conjunction with specially configured software/hardware interfaces were able to generate near realistic excitation signals as input to the simulation/emulation models. Using this, the developers and users could operate the BFV A3 System and perform the functions in a near realistic "virtual environment" in the laboratory. This completed the overall SES Process.

The SES was used to emulate late delivered components and perform confidence tests for all delivered components. The SES and the M&S environment also provided the software integration process with powerful tools. The software bindings between Computer Software Configuration Items (CSCIs) were exercised on simulated CSCIs before the completion of tactical CSCI tests.

The core of the BFV A3 System is the MIL-STD-1553B high speed digital databus that links all electronic/software subsystems and LRUs. (emphasis supplied). Within the BFV A3 System, there is a bus controller (BC), a backup bus controller, and over 20 remote terminals (RTs). To test and evaluate the operation of the system requires the capability to inject faults into the system and be able to detect them. Within the M&S environment a databus fault injection feature was developed, tested, and used as both an integration and testing tool. This feature allows the direct control over words sent across the 1553 databus. This adds the capability to change data that the user does not normally have control over when the model is running; the capability to change messages quickly, on the spot, without a modification to the existing models; the capability to quickly test many scenarios; hastening debugging problems by not requiring the models to be changed and rebuilt to change messages; the capability of simulating the effects of actual failures; enhancement of the ability to integrate new hardware by allowing the operation to send messages to the hardware to determine the response; and checking possible changes to the interface with an LRU that may have been implemented with an old/newer ICD (Interfaces Control Documentation).

The SES methodology was used to implement this fault injection feature. A GUI was added to the existing control panels. This GUI had the capability of faulting multiple words simultaneously. Each of these faults could be enabled/disabled individually with the corresponding enable switch. The RX (receiving) and TX (transmitting) buttons determined whether the faulted word was the received or transmitted word of the LRU. The RT number, subaddresses, and word number were chosen using the given controls. Each bit in the word was then set with the buttons to x (no fault), 0 (bit is faulted to 0), or 1 (bit is faulted to 1). This GUI was connected to the Fault_Injection_Inputs UCB at the top level of the model. The Fault_Injection_Inputs UCB simply set global variables according to the faults input by the GUI. The code for the interface between the model and the bus driver was modified to examine these global variables for faults when the bus controller transmitted or received data. Each message in the model checked to see if a fault was intended for it. If so, this interface replaced correct data with faulted data before transmission, or in the case of a received word, replaced the correct data with faulted data after it is received, passing the faulted data to the model.

Modeling and simulation, with visualization and hardware-in-the-loop formed the backbone of the SES process. The early requirements could be tested in the M&S formed SES. The architecture and design information traveled back and forth to the simulated and emulated system. The M&S based system also controlled a turret test-stand and a Crew Station. Combined with vehicle dynamics model, structural model, vehicle mobility model, the lab Crew Station allowed a user to try out a vehicle in a virtual battlefield.

A very powerful feature of the SES was not used in the BFV A3 system. As a part of simulation development, functional equivalent units were developed for each Computer Software Configuration Item (CSCI) and used in overall SES demonstration. In several system demonstrations, partially developed tactical CSCIs were operated in conjunction with functional equivalent units seamlessly. In "Using Modeling and Simulation for Rapid Prototyping and System Integration" (1997), Huang et al. describe an SES (stimulation/emulation/stimulation) process developed as a rapid prototyping and system integration tool for the BFV A3 system. Using system specification as a guideline, a rough order of system requirements were generated and used to produce a simulation design documentation. Using the computer-aided engineering (CAE) tool, a high level simulation model was produced in a very short time duration. The architecture of the high level simulation model consists of three major parts, namely, the program executive (PE), the graphic user interface (GUIs), and the placeholders (PHs). The PE controls the timing, scheduling and other simulation related functions. The GUIs provide the engineers with convenient displays and controls. Each subsystem simulation model occupies a specific placeholder. The reason for using this approach is that the system model will experience many revisions and eventually evolve into a high fidelity system model. This process would go through many evolution stages to increase fidelity as design matured, and software and hardware for the simulation improved while keeping maximum re-usability of the developed software. Due to the complexity of the A3 system, a multi-processor based real-time environment was developed. This COTS system uses the commercial version processor cards and operating environment of the tactical units. In addition to producing similar functions as the A3 System, this unit also has to generate simulated environment and perform simulation control. Within this real-time environment, a simulation scheduler monitors each cycle of the simulation. This real-time environment uses parallel processing to achieve high throughput while maintaining affordable cost.

With the readily available interface hardware residing in the special real-time environment, the communication between those simulation models have the same characteristics as the target system (same electronical characteristics, communication protocols, and produced the same timeline, etc.). The emulation provides a powerful system tool for system tests and system integration. Since the system model architecture was based on placeholders for those subsystems, the interfaces were also 'separated' and 'segmented,' i.e., modulated. When a newer subsystem model became available, it could be put into a specific place holder to replace the corresponding older subsystem model. Similarly, the interfaces were gradually replaced by special produced hardware/software connection modules. To do this, instead of connecting the subsystems within the software model, each subsystem was connected to the specific hardware connection software module. The communication and interaction between the subsystems was looped through the interface modules and eventually via the hardware interface cards.

External stimulation such as the movement of the platform and other physical disturbance can be produced using a combination of simulation models and software/hardware interfaces directly interacting with the real-time environment. As required by testing engineers, SES was able to be modified as test and evaluation (T&E) tools. Significant T&E functions required the capability to inject faults into the system and be able to detect them. Using the rapid prototyping tool a databus fault injection feature was developed, tested and used as both an integration and testing too.

This feature allowed direct control over words sent across the 1553 databus. This adds the capability to change data that the use does not normally have control over when the model is running, the capability to change messages quickly, or on the spot, without modification to the existing models, the capability to quickly test many scenarios, hastening debugging problems by not requiring the models to be changed and rebuilt to change messages, the capability of simulating the effects of actual failures, enhancement of the ability to integrate new hardware by allowing the operator to send messages to the hardware to determine the response and checking possible changes to the interface with an LRU that may have been implemented with an old/new interface control documents (ICDs).

The publication, Huang et al., "Simulation-Emulation-Stimulation A Complete System Engineering Process" (1998), describes the ongoing evolution of an integrated engineering methodology taking advantage of the advancement of computer technology by creating an System Integration Environment (SIE) that focuses on use of the Simulation-Emulation-Stimulation (SES) process. The original driving force behind development of this approach was the need to support the system integration of the Bradley Fighting Vehicle A3 System (BFV A3) (United Defense 1994f). A major concern for the BFV A3 System Integration EMD was that most of the subsystems would be completed and therefore supplied by subcontractors that were located in different and distant locations. Their subsystems would be delivered at different stages of the program. In order to ensure successful integration and demonstration of system performance, it was essential that subcontractors clearly understood how the system was partitioned, and the performance and interface requirements of the subsystems assigned to each subcontractor. Subcontractors were contractually required to deliver emulators/simulators of the subsystems to the prime to support the SES process. The system integrator was also responsible for generating alternative solutions, performing trade studies (United Defense 1994a) to select the best system architecture, and testing the architecture early, before design and building of the system. The tasks to verify system definition, monitor subsystem performance, document interface requirements in specifications and interface control documents (ICDs), and identify associated issues and concerns also belonged to the system integrator (United Defense 1994f, 1994b). This paper reports the evolution of this approach for producing rapid prototyping and performing system integration for the BFV A3 System and how it eventually evolved into a complete engineering process.

Just as real-time computer animation enables engineers to produce visual images that emulate objects in a "virtual environment," the authors describe the emulation of communication signals, that is the generation of communication signals that have the same electronic characteristics and use the same hardware and software, as a real communication signal. Using a combination of computer models, communication software/hardware (device drivers, communication protocols, chip sets, etc.), the physical characteristics of the communication and process of the emulated system is duplicated.

Due to the complexity of the A3 System, a multi-processor based real-time environment was developed. This environment used commercial versions of the tactical units to produce a reconfigurable system integration environment. This SIE used the same processors, operating system, device drivers, communication protocols, and other software and hardware components as the tactical units to produce near realistic time line and responses with a fraction cost of the tactical units. During the development stage, this SIE also served as the real-time simulator first, real-time emulator and stimulator later. It filled the roles of all temporally missing (unavailable) pieces during development and integration duration. The modular construction of the system model facilitated hardware-in-the-loop simulation. After acceptance tests, delivered subsystems replaced the corresponding simulation model one at a time by using a hardware connector that was installed to this SIE. This delivered subsystem would operate with other simulated subsystems and perform system level functions.

The SIE used CAE tools to produce simulation models and functionally equivalent unit (FEU) software modules. These simulation modules and FEU software were used to emulate the function of a complete software of a system. An interesting feature is that these automatically coded software almost completely avoided coding error and code level debugging. The debugging process can be moved into a pictorial environment. A system block diagram was used to debug the design.

To support testing engineers, the SIE was enhanced to be used as a T&E tool. A significant T&E function required was the capability to inject faults into the system and be able to detect them. Using the rapid prototyping tool a databus fault injection feature was developed, tested and used as both an integration and testing tool. A fault injection GUI (graphic user interface) and software module was constructed and used to perform the fault injection. The test engineer used this GUI to perform either manual or automatic test functions. The complete test results that included event number, event, words, pass/no pass, and time stamp were automatically recorded in test reports using this SE. Engineers had been using this tool to analyze and test the communication system for the Bradley A3 for over a year according to the authors. A publication by Huang et al., "System Simulation Based Engineering Process" (1998), reports the evolution of an engineering process that has been used on several major projects/programs. The paper refers to the significant effort that has been applied in modeling and simulation (M&S) at United Defense. Real-time simulation has become relative common practice with the proliferation of high performance and relative affordable computation devices. Running simulation in real-time has many benefits: In addition to acquiring detailed performance related information, it also allows the interaction and communication between simulated components to use live signals (i.e., with the same electrical or physical characteristics as the completed system). For a system designed for human operation, real-time simulation would allow humans to operate the simulation through appropriate input/output devices and displays. In other words, using appropriate hardware interface components, engineers can emulate the operation of the system before building prototypes. This is called a virtual prototype (VP). Using the same technique, external excitations or stimulation can be produced to mimic the complete system operation in a controlled (lab) environment. Using this approach, a system integration environment (SIE) was created using commercially of the shelf (COTS) hardware and software. The plug-in-and-play technique allows, one at a time insertion of a delivered subsystem into the SIE through the interface hardware/software. The corresponding subsystem simulation models, will then be disconnected or removed from the system simulation setup. This approach enables complicated system integration tasks to be broken down into more manageable pieces. Early in the program involving the integration of Bradley Fighting Vehicle A3 System (BFV A3

System), a high level simulation (HLSIM) was developed to understand the developmental system and identify system issues and problems. The HSLIM was evolved into BFV A3 System Simulation (SSIM) and achieved real-time simulation capability to allow user juries to test the system before the completion of the design. The SSIM was evolved into the System Simulation/Emulation (SSEMUL) to test the communication (mainly the MIL-STD-1553B databus) and tactical software. Yet another paper by Huang et al., "System Design Using Virtual Prototyping Techniques" (1998), discloses a new approach for system design. The approach is based on a methodology that utilizes simulation, emulation, stimulation (SES) combined with computer aided design (CAD) to produce virtual prototypes (VPs). According to the authors, United Defense has developed an SES process as a standard system integration methodology. This approach requires a system integration team working closely with all Product Development Teams (PDTs) throughout the program. Each PDT is responsible for the development of an individual subsystem or component. From the early requirements, the system integration team creates a high level system simulation model (HLSM) to provide an early representation of the system and identify problems and issues. With a powerful computer, the HLSM can simulate real-time system operation and generate realistic time lines. The interfaces among subsystems are simulated first, and emulated later. The system emulation allows communication between two entities (models of subsystems or components) using the same communication protocols, signal levels, and will produce the same time lines as the final system. Using commercial off the shelf (COTS) HW/SW, the emulation can be achieved quickly and economically. Next, SES produces stimulation for the system. A combination of computer simulation models and COTS HW/SW produce needed stimulation to excite a simulation model or a "real" object for test and evaluation purposes. A simulation controller is produced using graphic user interface (GUI) tools. The GUI tool produced controller may have a combination of "virtual" hand controllers such as knobs, slides, switches, and joysticks. Computer displays provide excellent status feedback for testing simulation. High quality video images can produce near realistic views of the hand controllers. These virtual control knobs, slides, switches, etc., are operated in the same manner as the "real things" through input devices (computer keyboard, touch screen, mouse, or joystick). Behind the "virtual" hand controllers and displays, software sockets and other communication schemes connect the virtual controls directly to the corresponding computer models. Through these virtual input devices, operators can test human factor related issues in a lab environment. A control station mockup can be constructed using a combination of computers and COTS HW/SW. Users can evaluate a controller design before controller hardware is built by using this lab setup. An interesting feature of the lab setup is that environmental or other external excitation, such as electronic interference, sensor data, or physical disturbances can be introduced by using a combination of simulation models and COTS HW/SW. To add more "virtual reality," computer images of complicated objects can be extracted directly from CAD drawings, and driven by powerful software on the computer monitors.

Similarly, video images can be connected directly to the real-time simulation to produce "virtual feedback" to the operator. Using ground database (information about terrain, soil property, etc.), computer programs can produce six-degrees of freedom (three linear and three rotary) movement disturbances and views to the "virtual driver." The virtual driver can drive a simulated vehicle on a "virtual road."

VP can supply the designers with complete system information in a lab environment before the start of detailed design. Many alternatives of design can be tested and evaluated with minimal cost and within a very short time frame. This virtual prototyping methodology is directly derived from the SES process. A collection of simulation models, high fidelity video images, and COTS HW/SW constitutes a system integration environment (SIE). This SIE provides the basis for a systematic approach to system integration. When a subsystem becomes available, through the reconfigurable software and hardware, it can be connected to the lab setup while the corresponding subsystem simulation model that resides in a particular placeholder is disconnected. The delivered subsystems are inserted into the lab setup one at a time. In this manner, the delivered subsystem will operate with simulated all other components.

This SES methodology has evolved smoothly into a virtual prototyping process. Almost all the software components developed in simulation, emulation, and stimulation became building blocks for the construction of VPs. The virtual prototyping effort is fully linked with all design efforts on the program. The structure of the VP also supported incremental system integration at a later phase of the program. Subsequently, the VP was used as a training device. T&E, and P3I functions could also be performed using the VP.

Presently, there exists a need for an armament control system design that can serve as the armament control system in the virtual environment of the development/simulation process, such as the SES process, and that can also serve as the actual control system for a multi-component armament system in the real installation. This control system should be dynamically reconfigurable to control a virtual prototype, a real component, or both. Additionally, there is a continuing need to provide a control system for a multi-component armament system that is scalable, easily upgraded, and that has improved usability, flexibility, and interoperability.

SUMMARY OF THE INVENTION

The present invention is a Control System Architecture (CSA) for a multi-component armament system. The CSA provides dynamic reconfiguration of multiple nodes (e.g., a component, a subsystem, or a virtual simulation) in a Simulation-Emulation-Stimulation (SES) environment utilizing redundant client-server bus configuration of the nodes in a hierarchical model. The CSA provides for ease of configuration of nodes for any specific application, automated system reconfiguration capabilities to detect and bypass failed nodes or re-group available remaining nodes in the event of degraded mode operation, and expansion and/or downsizing of nodes without requiring a modification to the overall system architecture.

Unlike existing control systems that connect all of the armament components to a common bus controlled by a single controller, various components of the CSA are preferably connected in a web-like topology. The use of a single common bus to interconnect multiple components of an armament system has been dictated by the need for well defined communications between the controller and the armament components. A signal to fire a weapon must be delivered to that component in a timely manner. The single bus single controller architecture enables existing systems to be designed such that control signals will arrive when expected. In contrast, a web-like topology provides for multiple communication paths between components and, as such, delivery of messages usually is not accomplished in a deterministic manner. To overcome this, the present invention utilizes a real-time scheduler within the CSA to monitor communications in the client-server architecture. The scheduler enables the CSA to overcome slow points and broken lines of communication while still preserving the predictable time response required of an armament system. This imparts an increased robustness to the system that is not found in the prior art armament systems, each of which featuring point-to-point communications topology.

One embodiment of the present invention provides for a client-server type multi-tiered hierarchical network for controlling a multi-component armament system. In one case, the top level of the system comprises a system controller. The system controller is comprised of an input/output management (IM) server, a notational controller (NC) server, and several placeholder (PH) servers. The second layer is comprised of a man-machine-interface (MMI) client, a plant model client, and a controller client. The third layer is comprised of first and second graphical user interfaces (GUI's) and a test stand. The MMI is configurable to operate either a virtual prototype of an armament component, a real version of the armament component, or both. The switching between the virtual prototype, real prototype, or both is preferably accomplished by the inclusion of an A/B/C switch programmably included in the system controller software. The inclusion of the A/B/C switch in the hierarchical client-server architecture allows the CSA to be reconfigured during system development and test. Additionally, the hierarchical nature of the CSA promotes system scalability, in that new nodes can be added to or subtracted from a level, and even new levels can be added to the system. The scalability feature allows the system architecture to be easily modified, upgraded and maintained.

Each node in the CSA can assume either a server role, a client role, or both, in the hierarchical architecture. The overall control function of the CSA can be handed down by the system controller to a client component at a lower level or to a new component added to the system with that component then assuming a server role in the CSA. Preferably, the CSA uses commercially available operating environments and is communicably connected to an intranet.

BRIEF DESCRIPTION OF THE DRAWINGS

FIG. 10 is an exploded parts view of the real time controller according to one embodiment of the present invention.

FIG. 11 is a front view of the real time controller of FIG. 10.

FIG. 12 is a side view of the real time controller of FIG. 10.

FIGS. 19 and 20 are a front and side view of the DAC card.

DETAILED DESCRIPTION OF THE PREFERRED EMBODIMENT

Figure 1:
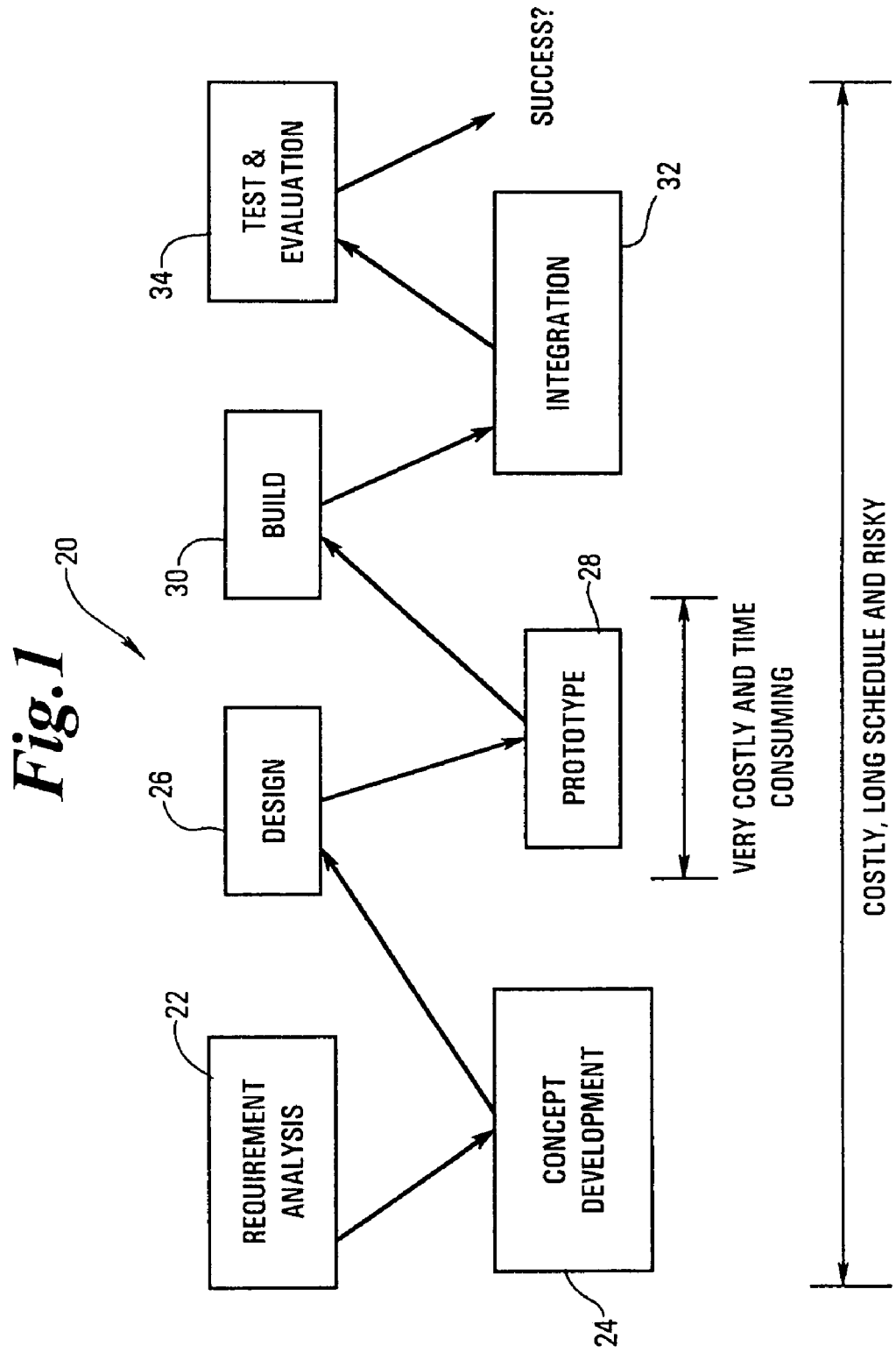
FIG. 1 is a diagrammatic chart of the prior art engineering development process.

Referring to FIG. 1, the prior art conventional engineering development process is shown generally at 20. The steps of the prior art design process are, in order, generation of system requirements 22, development of concepts 24, produce designs based on the concepts 26, prototyping 28, building individual systems 30, integrating those individual systems 32, and performing testing and evaluation of the completed system 34. If the testing and evaluation stage 34 revealed that the particular design is not acceptable, then the process must be reiterated starting back at the prototype stage 28, or earlier.

Figure 2:
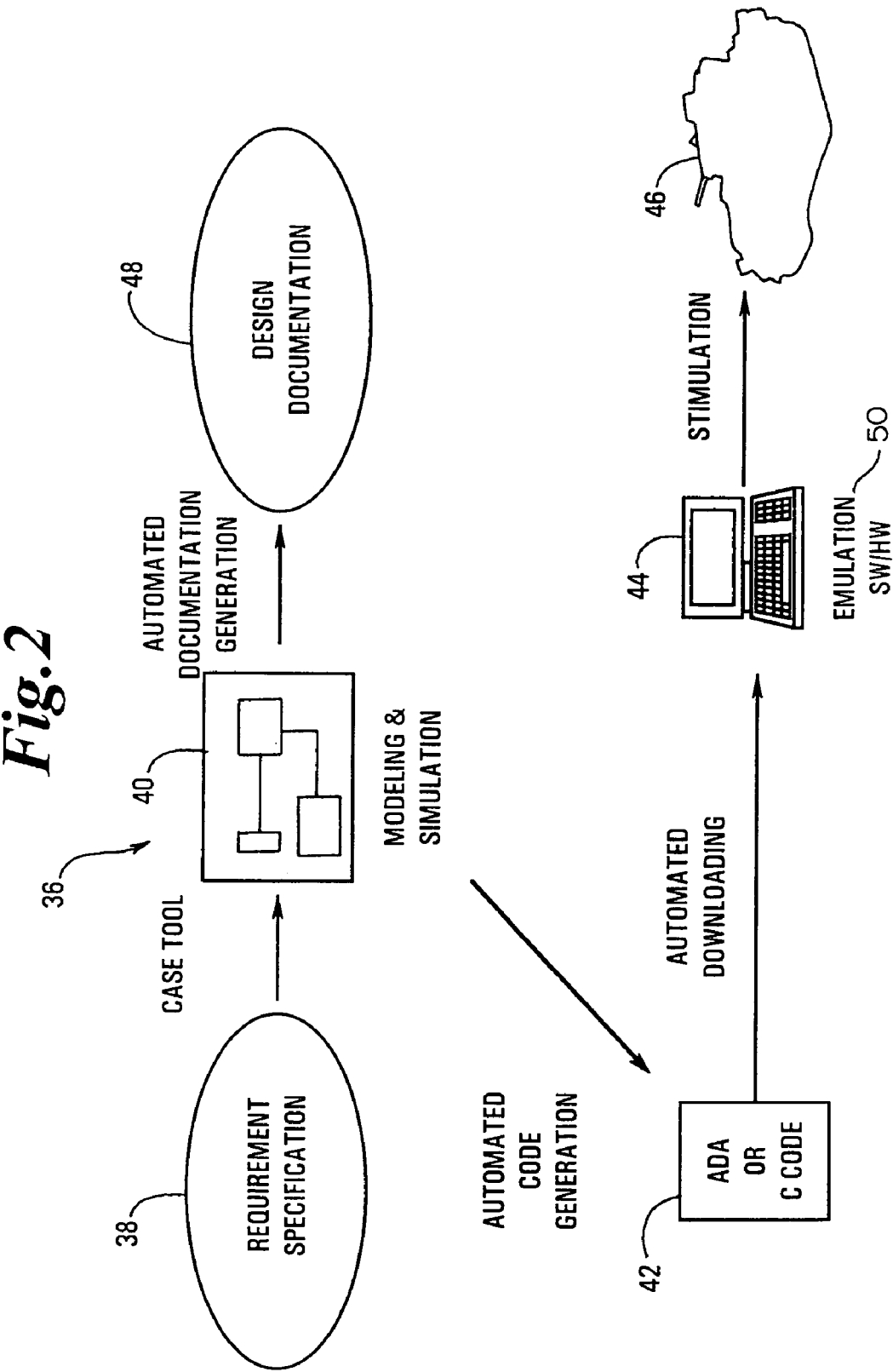
FIG. 2 is a diagrammatic process chart for the SES process.

Referring to FIG. 2, the Simulation-Emulation-Stimulation (SES) process, generally designated at 36 minimizes the required iterations and condenses the steps of the prior conventional development process. SES comprises the steps of using system specifications to generate a set of system requirements 38, performing modeling and simulation (M&S) 40 of the multi-component armament system, simultaneously generating design documentation 48 and system code 42 from the simulation, downloading the system code 42 into an emulation environment 44, and stimulating the emulation 46.

System specifications for armament systems are typically provided by the customer. Designated members of a development team use their collective experience and intelligence to construct a set of system requirements from the specifications. Then, using Computer Aided Engineering (CAE) tools, those requirements are incorporated into the modeling environment as part of the M&S 40 step. Those skilled in the art will recognize that many different types of CAE tools are commercially available that are well suited for the M&S task 40. The model generated by the CAE tools is referred to as a high-level simulation model (HLSM). The mechanical system models are constructed by using off-the-shelf programs such as ProEngineer from PTC. Other suitable alternatives are Solid Works, Catia and AutoCad. The electrical controls are similarly simulated, preferably using MatrixX by ISI (Integrated Systems Inc.). Those skilled in the art will recognize that electrical and mechanical schematics can be produced as an inherent function of these M&S programs. Such schematics become part of the system design documentation 48. The MatrixX program possesses the capability to automatically generate the computer code required to operate any of the various components of the armament system. This is a powerful feature because it eliminates the tedious line-by-line coding and debugging tasks otherwise necessary. Automatically generated code has passed rigorous scrutiny in armament control systems and such code is currently used in many mission critical military applications.

The HLSM is first tested on the emulation environment 44 to produce preliminary results. The CAE tools allow for changes to be made to the system models and the generation of functionally equivalent software modules 42. From the HSLM using the CAE tools, a set of design documentation can be generated 48. The design documentation is useful to the subsystem design teams because it provides a detailed set of requirements to guide the development of a particular subsystem.

The system model and software modules can then be used to emulate the function of the complete software of the system in an emulation environment 44. This process is often referred to as rapid virtual prototyping (RVP). The software code is downloaded into an emulation environment 50. The emulation environment is preferably the same control system that will be used in the field application to control the multi-component armament system. The virtual prototypes in the SES process use CAE tools to simulate the characteristics of their corresponding armament component within the emulation environment 50. As individual development teams proceed with the development of their respective subsystems, they can use the control system connected to the virtual prototypes to experiment with how the system might respond under different hypothetical circumstances. They can also replace their subsystem with its respective virtual prototype and test the functionality of the subsystem in the overall control system.

Figure 3:
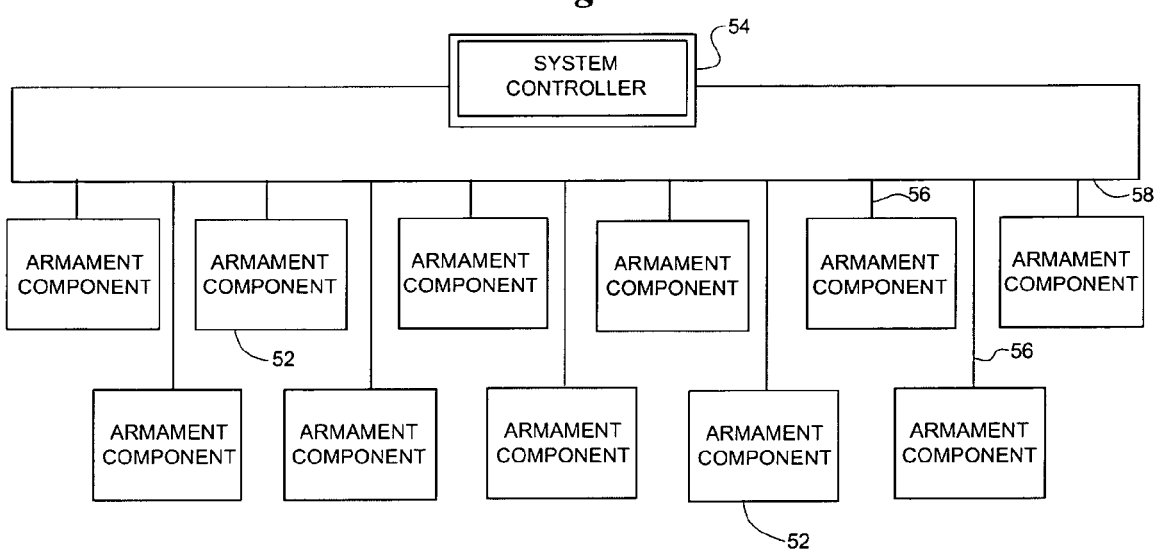
FIG. 3 is a schematic of a prior art single bus, single controller armament system architecture.

FIG. 3 illustrates a typical control system used in multi-component armament systems and as part of the SES emulation 44 hardware. A plurality of armament components 52 are connected by a single MIL-STD 1553 bus 58 to a single system controller 54. Each component 52 has a single connection 56 to the common bus 58. The system controller 54 regulates the flow of information in the system as it moves along the bus 58 in a point-to-point communication manner. If a new component is added to the system, a component removed, or a component replaced with a different one, the controller 54 must be extensively reconfigured and modified. It was found that the simulation of such a single bus, point-to-point control system for the SES emulation hardware 44 was quite complicated to accomplish, and involved significant modification and adjustments. Most importantly, it was cumbersome and complicated to modify the emulation environment 50 to add or delete additional components 52 into the control system.

The present invention overcomes the drawbacks of a common bus architecture for interconnecting multiple components in an armament control system by employing a control system architecture (CSA) that utilizes a client-server hierarchical architecture. Conceptually, the difference between the present invention and the prior art can be best understood by comparing FIG. 3, showing a common bus architecture, with FIG. 4 which shows a client-server architecture in accordance with the present invention where all of the armament components 62 are connected to a web-like intranet 60. A real time scheduler 63 is shown as part of the intranet 60 and monitors communications among the various components 62 to determine whether communications are received when expected and, if not, to notify the sender that a communication was not received as expected.

Figure 4:
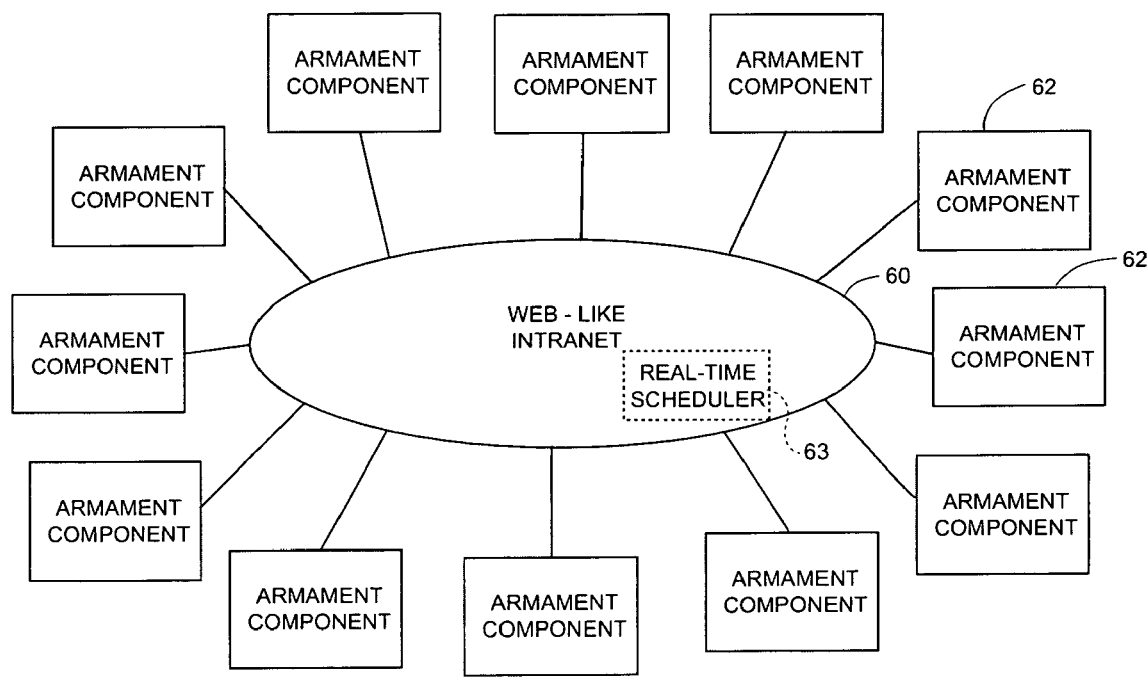
FIG. 4 is a conceptual representation of the web-like connectivity a multi-component armament system in accordance with the present invention.
Figure 5:
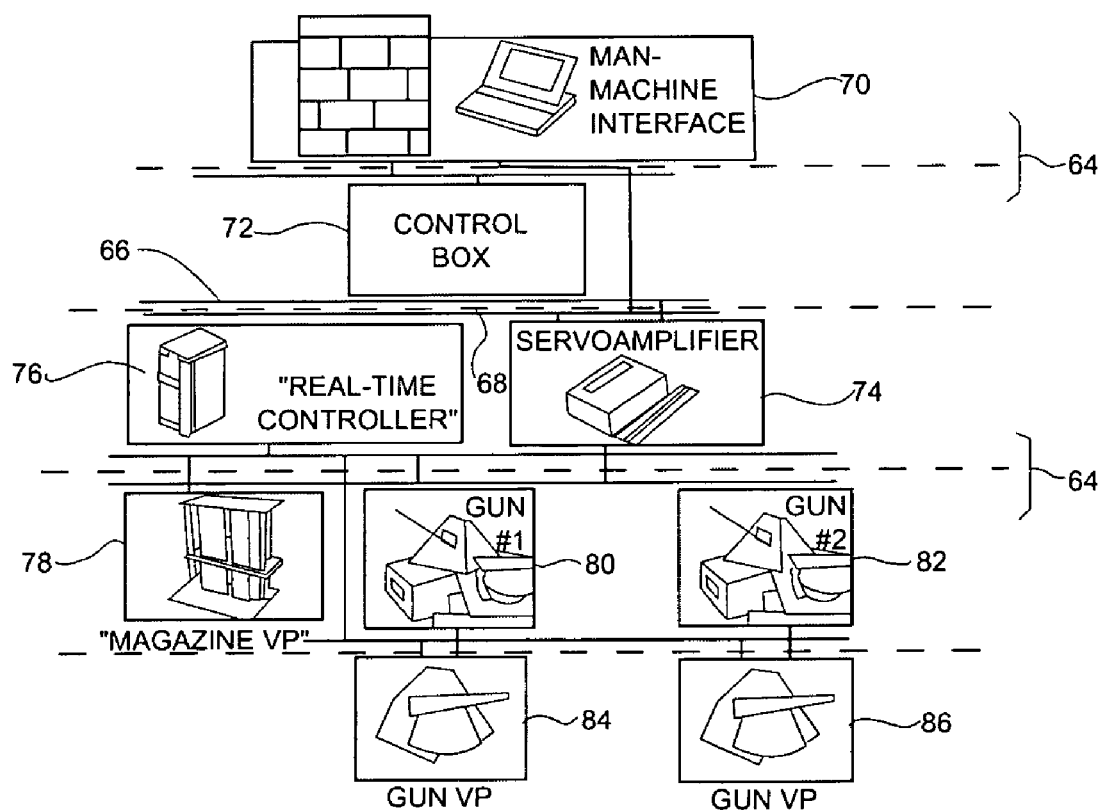
FIG. 5 is a hierarchical diagram of a multi-component armament system having a control system architecture according to one embodiment of the present invention.

It will be understood that while an intranet 60 is often conceived of as a web-like connection arrangement as shown in FIG. 4, actual physical and logical interconnection must occur within the intranet 60. Although the term intranet, as used within the present invention, includes the common understanding of all of the various ways in which actual physical and logical interconnections between machines and routers can be configured to create such a network. It should be understood that for purposes of the present invention, it is intended that the term intranet is not limited to a conventional intranet arrangement and is better understood as a physical and logical interconnection of nodes that is "intranet-like". In the present invention, a structured system hierarchy preferably is used to segment the intranet 60 of the CSA into manageable tiers with each tier containing at least one of components 62. A generic representation of this structure is shown in FIG. 5. The hierarchical system is divided into multiple tiers 64 of components 62. New tiers 64 may be added or entire tiers 64 subtracted from the whole system with few changes required to the overall operation. The nature of the physical and logical interconnection among the various components 62 in the intranet 60 will depend upon the components being connected and no restrictions are intended for these connections. Instead of using the point-to-point communication scheme of the common bus architecture, the present invention utilizes a transmission control protocol/internet protocol, such as (TCP/IP) client-server communication scheme in which communications can be passed among different components 62 within the multiple tiers 64 of the intranet 60 until they arrive at their intended destination. Those skilled in the art will recognize that by configuring each of the various components 62 as a client-server, server functions can be handed down from a server towards the top of the hierarchy to a client lower in the hierarchy. This makes the system more robust because single component/subsystem failures will not likely cause a system wide failure. Preferably, the intranet 60 includes at least two different types of communication connections, a data connection 65 and a control signal connection 68. The data connection 65 can be any connection over which a net-based protocol such as TCP/IP client-server communication scheme is routed. Alternatively, any other form of client-server packetized data communication scheme could be used for the data connection 65. It will also be seen that the data connection 65 can include multiple redundancy features to provide further robustness to the CSA, or that more than one unique data connection 65 could be utilized with the present invention. The control signal connection 68 allows for a connection between nodes 62 of control signals other than conventional data signals. As will be described, these control signals can be amplified electrical signals used to control positioning apparatus in one or more of the nodes, for example. Although, the data connections 65 and control signal connections 68 are described in terms of electrical connections, it will also be recognized that such connections could be accomplished using optical, infrared or radio signals, as long as appropriate security and performance parameters can be met by such alternative communication connections.

Figure 6:
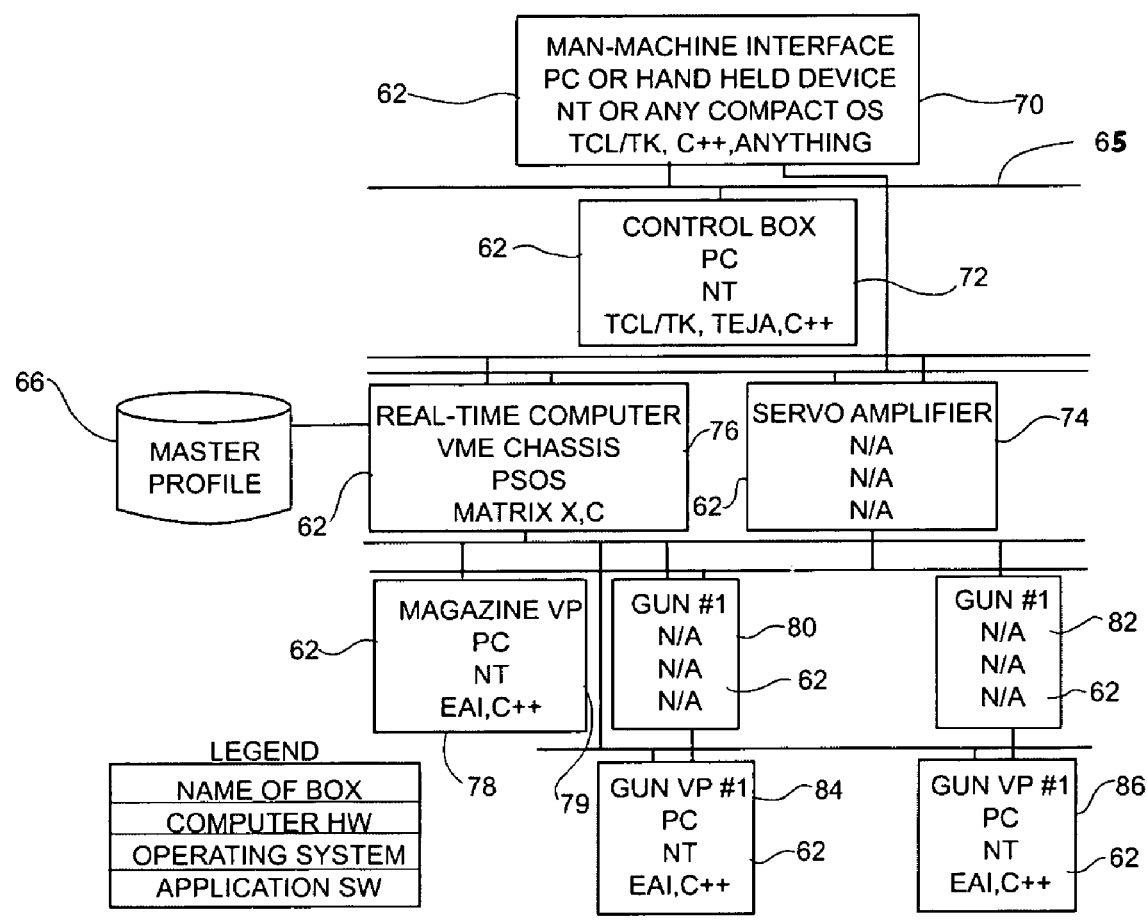
FIG. 6 is the diagram of FIG. 5 showing component details.

The CSA can easily accommodate the addition or subtraction of nodes due to the client-server nature of its hierarchy. Persons skilled in the art will understand the ability to add and subtract nodes from a client server network. Conceptually, for ease of understanding in armament systems, each component 62 or client can be represented as a component node 62 in the hierarchy as shown in FIG. 6. Each component node 62 has a distinct IP address. In a preferred embodiment, the real-time controller 76 contains a master node profile 66. The master node profile 66 contains the list of authorized IP addresses and corresponding client characteristics for each component node 62 in the hierarchy. The master node profile 66 only can be edited by an operator having authorized access. Within the real-time controller 76, a real-time Operating System (OS) preferably employs a master request routine. When the master polling routine encounters a new component node 62 in the hierarchy, the master polling routine compares the IP address of the new node to the master node profile 66 to determine both the validity of that node and the characteristics of the component(s) associated with that node. If the IP address is authorized, the client associated with that node is effectively brought on-line. If the new node is not authorized, it will not be brought into the system until authorization is provided. Similarly, the master polling routine recognizes the absence of a node and deactivates the corresponding client loop, effectively taking that component off-line.

An example application of the CSA having two guns 80 and 82 is shown schematically in FIG. 5. A man-machine-interface (MMI) 70 is operably connected to a control box 72, a real time controller 76, a servo amplifier 74, an ammunition magazine virtual prototype 78, gun #1 80, gun #2 82, virtual prototype gun #1 84 and virtual prototype gun # 86. The MMI 70 is the means an operator uses to input command information in to the CSA. The MMI 70 can be a laptop PC, a keyboard, an interactive graphical user interface (GUI), a joystick, or even a remote device, such as a personal digital assistant (PDA). In this case, the MMI 70 is a user interface component node 62 in a first hierarchical layer, the control box 72, real-time controller 76 and servo amplifier 74 are control component nodes 62 in a second hierarchical layer, and the magazine virtual prototype 78, gun 80 and gun 82, as well as virtual prototype guns 84 and 86 are all armament component nodes 62 in a third and fourth hierarchical layers. It will be understood that the armament component nodes 62 can be either actual armament components or systems, scale models of such actual armament components or systems, or virtual prototypes of such actual armament components or systems or proposed armament components or systems.

FIG. 6 shows the example as schematically illustrated in FIG. 5 with indicated box name, computer hardware, operating system, and application software. The MMI 70 is the interface between the system operator and the system itself. The MMI 70 uses a common off-the-shelf (COTS) operating system (OS) such as Windows NT® from Microsoft. In one embodiment, the MMI 70 employs a compact OS commonly used by any of various hand held personal digital assistants (PDA's). The PDA has advantages over other types of man-machine interfaces that use a full-blown OS because it utilizes a compact OS having a quick recovery time if the PDA must be re-booted after an error occurs, whereas an MMI 70 employing a more complicated OS such as NT will have a relatively longer recovery cycle. Under time critical circumstances contemplated by an armament system, quick recovery time is absolutely necessary. The MMI 70 is able to controllably operate the armament system using client control interface programs written in known computer languages or CASE tools such as Tcl/Tk, C++, Teja, or an equivalent. Each of the control interface programs in the MMI goes through a software socket into the real time controller 76. The control box 72 provides the server function for this software socket. The control box 72 is preferably another client/server computer running an NT or other net-suitable OS that runs the server side of the control interface program written in a programming language or CASE tool such as Tcl/Tk, C++, Teja, or an equivalent to pass control commands from the MMI 70 to the appropriate component. In an alternative embodiment, the MMI 70 and control box 72 could be implemented as part of a single layer 64 in the hierarchy by using a single personal computer as the man-machine interface. Preferably, the MMI 70 and control box 72 are divided into different layers 64 in order to allow different types of components to be used as the MMI 70 and to allow more than one MMI component 70 to provide an interface to the intranet 60.

In a preferred embodiment, the real-time controller 76 is housed in a VME chassis, which contains a plurality of processor cards to implement the various functions of the controller 76. Alternatively, other backplane chassis arrangements than a VME bus, a PCI backplane, or even a single processor board, could be utilized to implement all of the functions of the controller 76. The real-time controller 76 executes a real-time operating system pSOS from Integrated Systems, Inc., in the preferred embodiment. In the past other real-time operating systems such as Linx OS and VxWork have also yielded satisfactory results. As will be described, the real-time OS fulfills the role of the scheduler 63 in the exemplary embodiment of the client-server hierarchy of the CSA of the present invention.

One problem that had to be solved when employing the client-server web-like network in the context of an armament control system is timing of data communications. To illustrate the problem, consider the example of the most well-known client-server web-like network, the world wide web (WWW). Anyone who has used the WWW knows that e-mail sent over the WWW takes a random amount of time to reach its intended destination. Sometimes this may be one second, sometimes one minute, sometimes one hour, and sometimes one day or longer. This unpredictable time delay is unacceptable in an armament or other time-critical control system. One cannot spare minutes, hours, days, or even seconds for a fire command to reach a firing control client that activates the weapon. Therefore, the present invention provides a scheduler 63 that is part of the intranet 60 and preferably is programmably included in the pSOS real-time OS of the controller 76. The scheduler 63 monitors the time it takes communication over the Intranet 60 to reach its destination. If the communication does not reach its destination in the specified time as determined by the master profile database 66, the scheduler 63 notifies the originator of the message that an error in transmission occurred, in this case due to a timeout failure. The client originator will then take whatever remedial actions are proscribed in the event of a communication failure. By the inclusion of a scheduler 63, the CSA of the present invention knows whether a communication signal between different component nodes 62 in the network 60 reaches its destination in a timely fashion because the scheduler fulfills the policing function.

Figure 7:
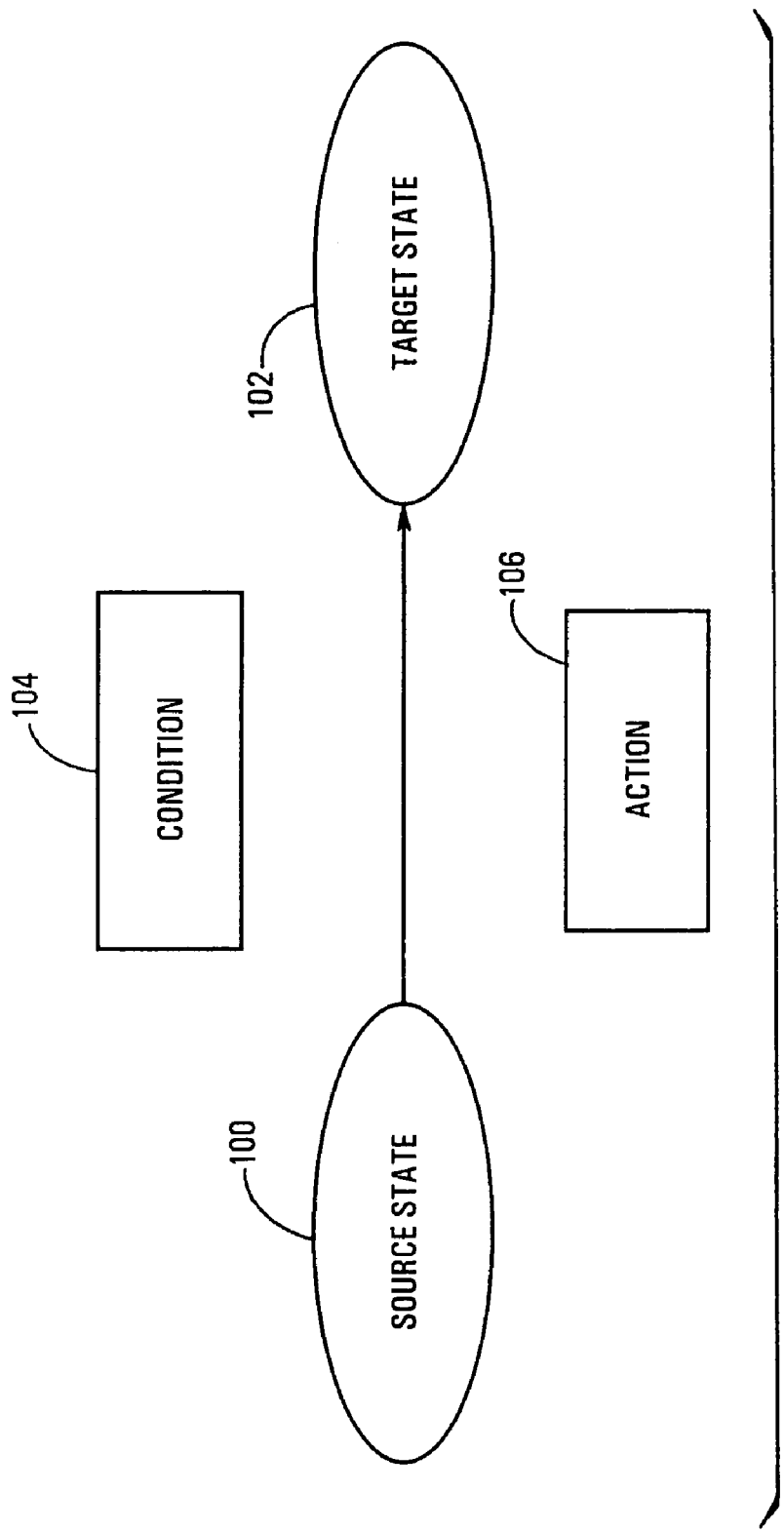
FIG. 7 is a conceptual diagram of a state machine.

The real-time controller 76 uses computer code to control each of the various clients in the lower levels 64 of the hierarchy. A CASE tool such as MatrixX is preferred because the control system hierarchy can be implemented by inputting the desired computer logic into the MatrixX program, thereby automatically generating the code. However, C or any other computer language that can be compiled or some script languages such as JAVA can also be used. The system behavior encoded in the software can be described as a state machine. The concept of describing system behavior with a state machine is known to those skilled in the art. Conceptually, a state machine is shown in FIG. 7. The component is in a particular resting condition referred to as the source state 100. When a pre-defined condition 104 occurs, a particular action 106 is taken that triggers the component to enter the target state 102. The server for a particular component can monitor the state of that component and communicate it to the real-time controller 76 and the operator through the MMI 70. States themselves can be broken down into sub-states and so on, thereby providing further suitable control functions.

Figure 8:
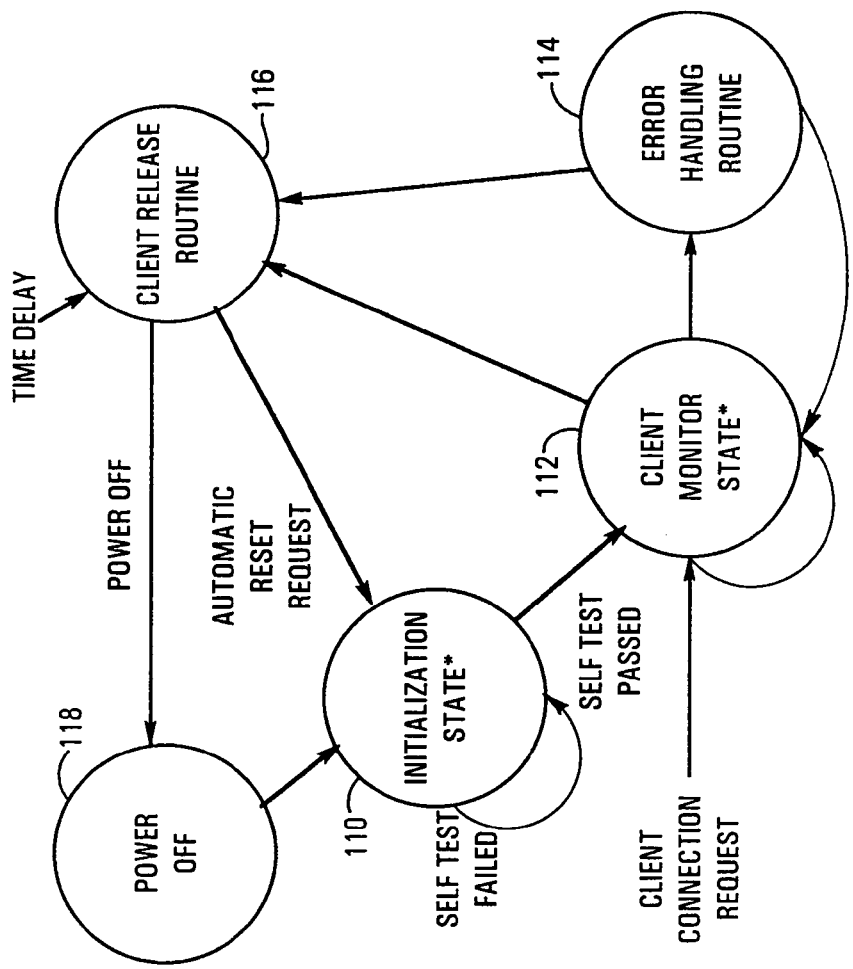
FIG. 8 is a state diagram of a preferred embodiment of a state machine for the control system of the present invention.

FIG. 8 illustrates the state machine used in the preferred embodiment of the present invention. Starting with power off state 118, the system power is turned on. The system then enters the initialization state 110. Within the initialization state 110, a self-test is performed to verify proper function of the controller 76. If the self-test fails, then it will reiterate. After several passes, if the failure persists, a failure indication will be provided to the operator so the problem can be corrected. If the self test 110 is passed, the system proceeds to the client monitor state 112. As will be described, the client monitor state 112 is where the controller 76 spends most of its time when the CSA is up and running and handling client connection requests. If an error is detected in the client monitor state 112, control will be passed to an error handling routine 114. A client release routine 116 can be entered either by the client monitor state 112 detecting that a given client (node) has dropped out of the network, or indirectly as a result of the error handling routine 114.

Figure 9:
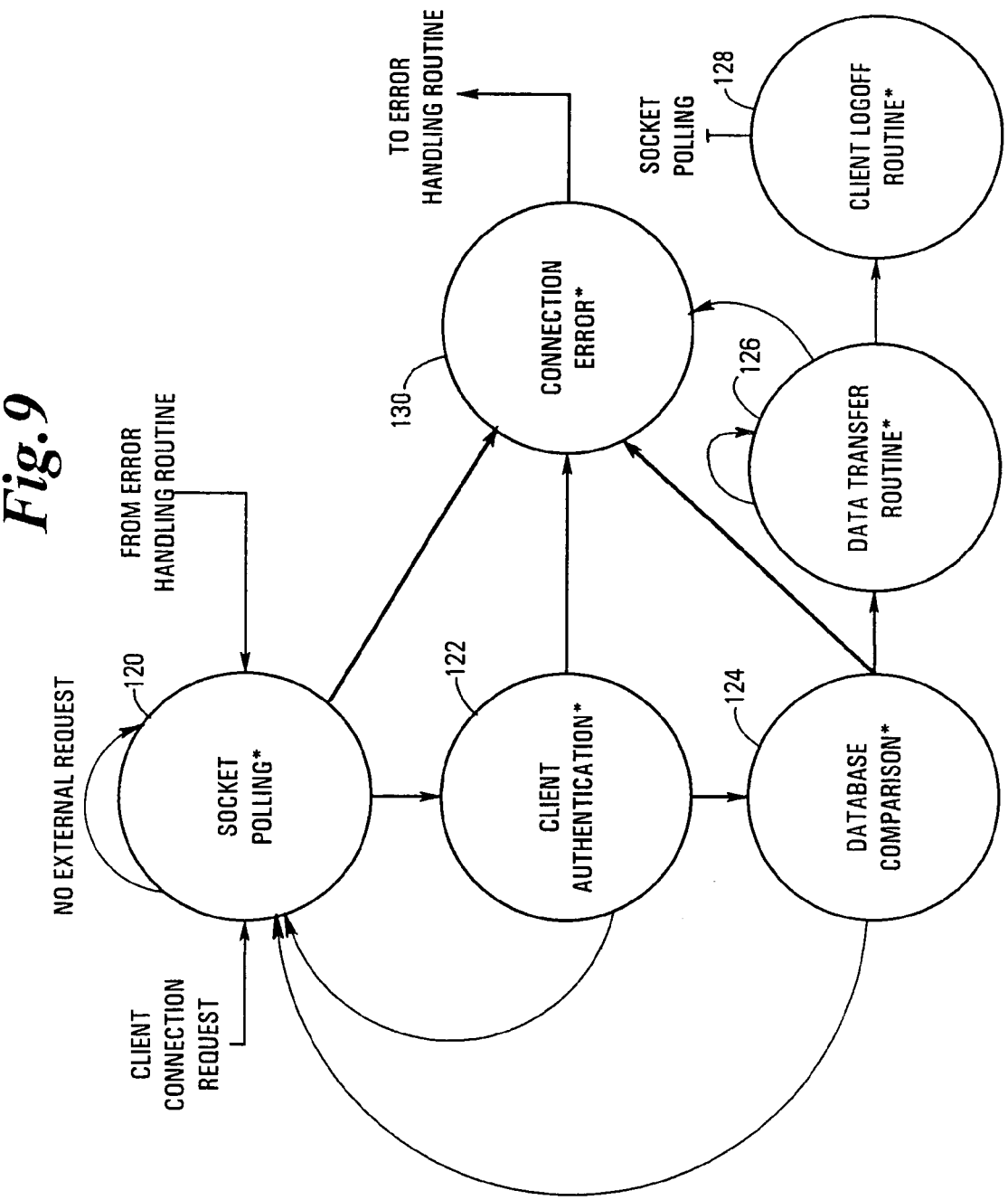
FIG. 9 is a detailed state diagram of showing further details of the state machine of FIG. 8.

FIG. 9 illustrates the details of the client monitor state 112. First, the master polling routine 120 polls the software sockets to determine whether there are any client connection requests received from the nodes 62 in the network. Although a polling arrangement is described, it will be understood that the polling routine could also be implemented using priority interrupts or some combination of polling and interrupts. In response to a client connection request, the request is authenticated at client authentication 122. If there is an unauthorized client, the connection error 130 is triggered and information sent to the error handling routine 114. If the connection request is authenticated, it is passed to the database comparison state 124. The database comparison state 124 checks the connection request against the master profile database 66 to determine the parameters and profiles to be used in processing the connection request. If the database is not properly verified for the connection request, a connection error 130 occurs that sends information to the error handling routine 114. The data transfer routine 126 enables the data transfer to occur between the client and server and monitors the transfer in accordance with the parameters set in the master profile database. In the event of a timeout condition, the data transfer routine 126 would transfer state control to the connection error routine 130. To insure that each transfer is appropriately authorized and monitored, once a data transfer or data communication is complete, a client logoff routine 128 effectively ends the authorized communication channel between the client and server for that communication. From the client logoff routine 128, the client monitor state 112 returns to the main polling routine 120.

Referring again to FIG. 5, a servo amplifier 74 is also contained within the control system and connected to the other various components. Servo amplifiers are well understood by those skilled in the art. The servo amplifier 74 functions to amplify the control signal sent along the control connections 68 to the physical manipulation mechanisms of an actual gun 80 and/or 82, for example. These control signals could be to power an electric motor that turns the platform on which a gun 80 is mounted. The servo amplifier 74 is necessary to boost the power, current and/or voltage of the control signals to the appropriate levels to properly drive the physical manipulation mechanisms of an actual physical component 62. Suitable servo amplifiers are available either as COTS or custom-made devices particularly adapted to the requirements of a given physical component 62.

The CSA when used in the SES system also includes a plurality of virtual prototypes (VP's). As shown in the preferred embodiment of FIG. 5, a VP of two guns, gun #1 80 and gun #2 82 are connected along with a VP of an automated ammunition magazine 78. Virtual prototypes have all the attributes (shape, dimension, weight, friction, etc.) of the real prototype, except that all of these attributes are modeled in digital form. This allows many variations of prototype to be tested without the time and expense of creating a real prototype. The VP physically is a personal computer or equivalent running specialized software that simulates the prototype in a virtual world. Programs well suited to running VP's include a combination of graphical software by Engineering Animation, Inc., and real-time dynamics software by MatrixX (by ISI).

During the development process, it is also advantageous to be able to connect a scale size real prototype to the CSA as shown in FIG. 5, for example, for gun 80. Each real prototype is also a client/server having an IP address that is connected to the control system architecture. Instead of inconveniently disconnecting the VP of a component and connecting the real prototype, an A/B/C switch is preferably implemented as part of the real-time controller 76 to allow dynamic switching between the virtual component, its prototype, or both simultaneously. Preferably, the A/B/C switch is a combination of software executing in the real-time OS coupled with appropriate connection path switches for both the data connections 65 and the control signal connection 68.

Figure 13:
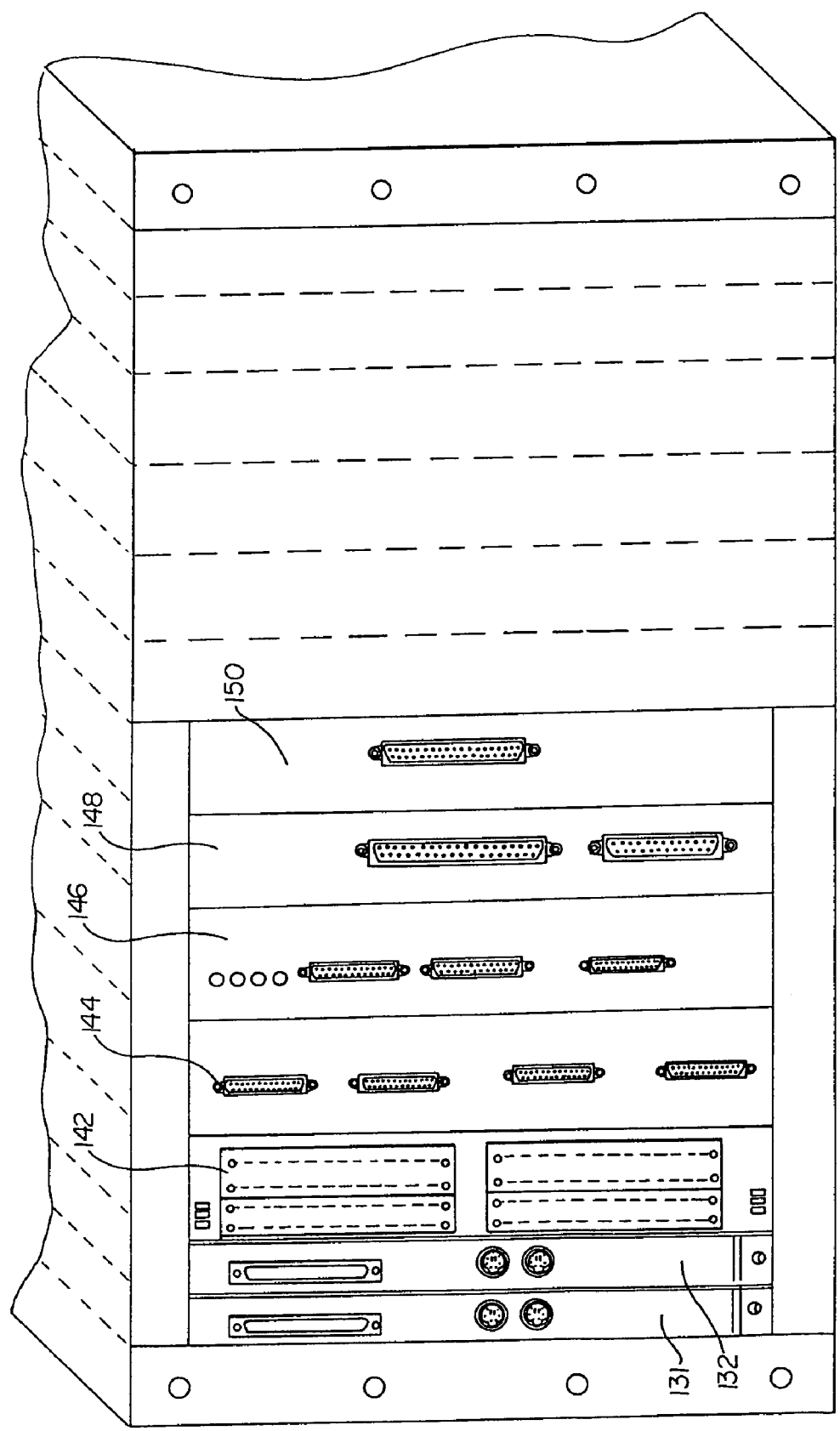
FIG. 13 is a front view of the VME rack of the real time controller of FIG. 10.
Figure 14:
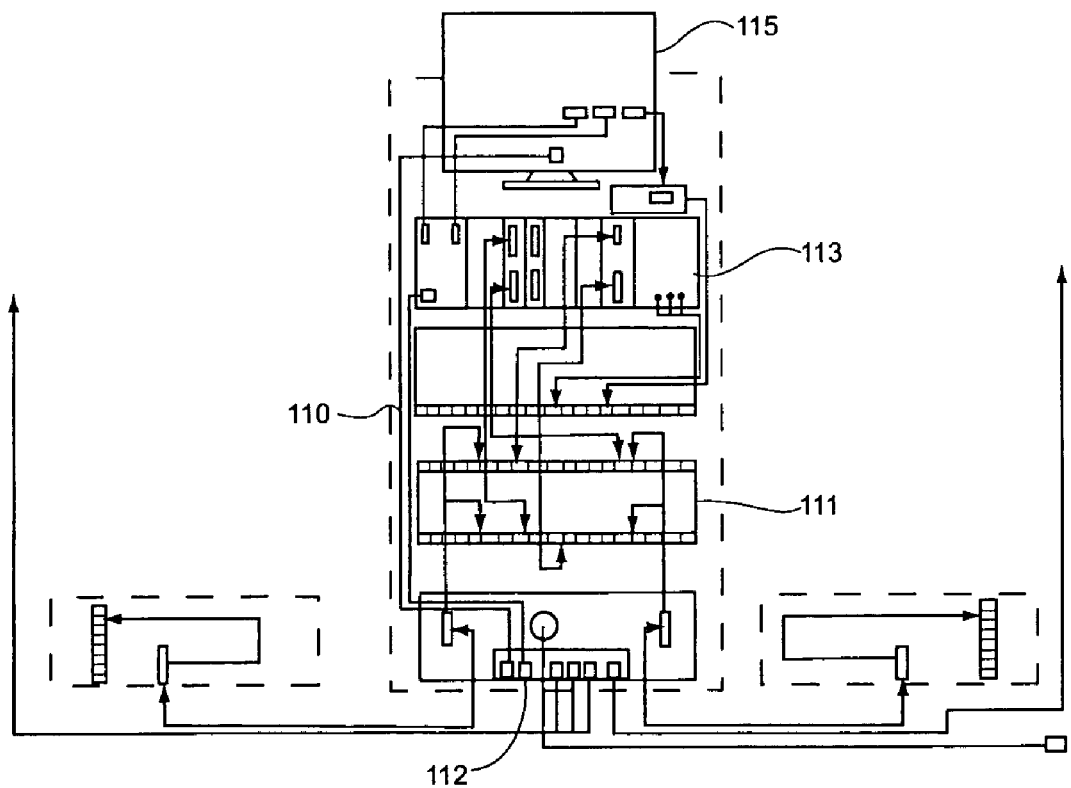
FIG. 14 is a block diagram of the internal cabling for the real time controller of FIG. 10.

FIG. 10 is an exploded depiction of a preferred embodiment of the hardware for the completed real-time controller 76, also shown in FIGS. 11 and 12. The cabinet frame 101 has a Plexiglas® front door 102 pivotally attached to the left side of the frame 101. The side panels 103 are fastened to the frame 101. The back panel 104 is fastened to the rear of the frame 101 and louvered to promote sufficient airflow which aides in cooling the cabinet. Back panel connector 105 is affixed to the back panel 104. Top and bottom panels 106 are fastened to the frame 101 and the bottom of the frame is fitted with a roller caster assembly 107 to aide in transporting the real-time computer 76. The cabinet further includes an outlet surge protection block 108 and a 30 volt power supply 109. A power relay switching panel 110 and a terminal block cable termination panel 111 are connected as part of the cabinets power supply system. The cabinet is supplied with a twelve-port communications hub 112 which is preferably 100 base T. The VME rack 113 holds the plurality of control cards which comprise the processors for the real-time controller 76. The cabinet also has a roll out keyboard 114 for holding a keyboard functioning as the MMI 70. A computer monitor 115 serves as the GUI for the MMI 70. Finally, the cabinet includes an indicator/switching panel 116 with a plurality of LED's 119, other indicators 120 and switches 118. FIGS. 13 and 14 provide front and side sectional views of these cabinet components in their preferred embodiment. Although a single real-time controller 76 is shown and described in the preferred embodiment, it should be understood that the present invention contemplates the use of multiple real-time controllers 76 within the client-server architecture of the CSA of the present invention for larger numbers of components. Ideally, multiple real-time controllers 76 would provide the CSA with a further level of redundancy in the event of a failure of one or more of the controllers 76. Appropriate synchronization software to allow for coordination of such multiple controllers can also communicate over the CSA of the present invention. Alternatively, controller 76 could be expanded to accommodate the required number of connection ports as necessary to support a larger number of components 62.

FIG. 13 shows a close-up view of the VME rack 113. The VME rack holds several Motorola® PowerPC processor cards. Alternatively, Intel® processor cards (x86 and various version of Pentium®processors) or RISC 4600 and RISC 4700 cards can also be used to produce satisfactory results. Each card is runs on the pSOS real-time operating system and employs MatrixX software to communicate with an armament component. FIG. 14 shows the internal and external cables for the VME rack 113.

Figure 15:
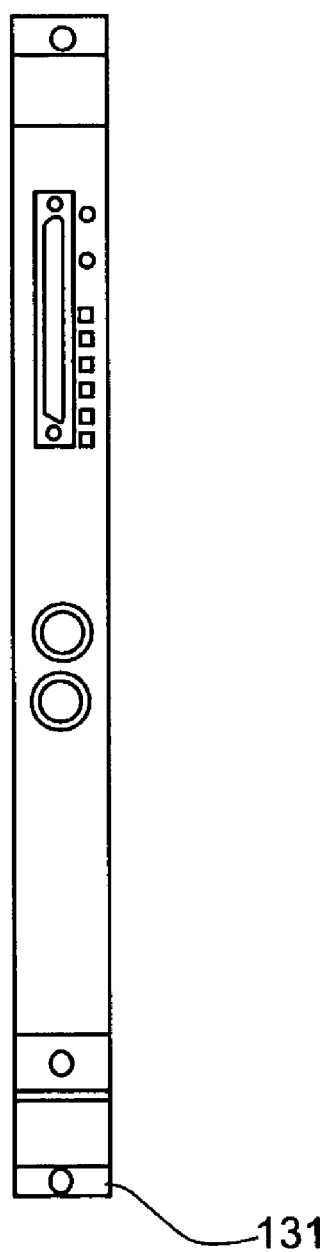
FIGS. 15 and 16 are front and side views of the CPU controller cards in slots one and two of the VME rack of FIG. 13.
Figure 16:
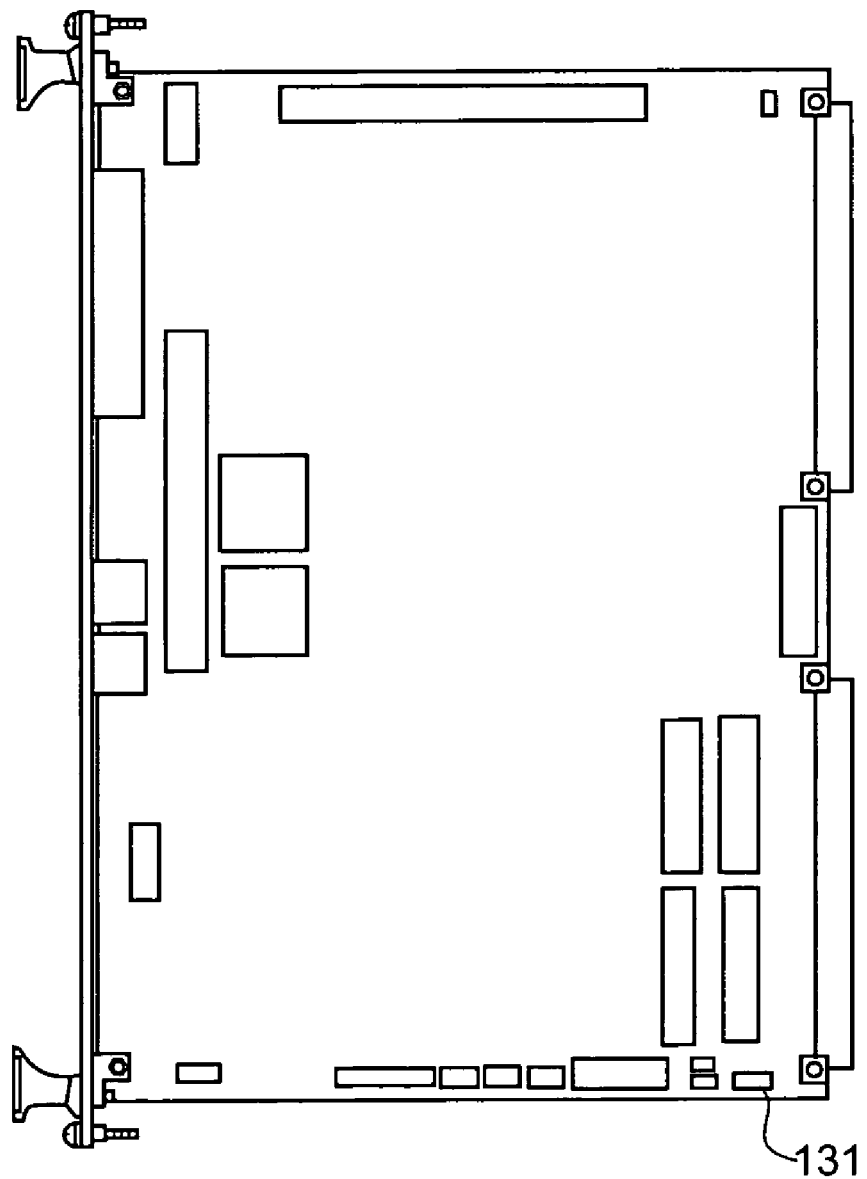
Figure 17:
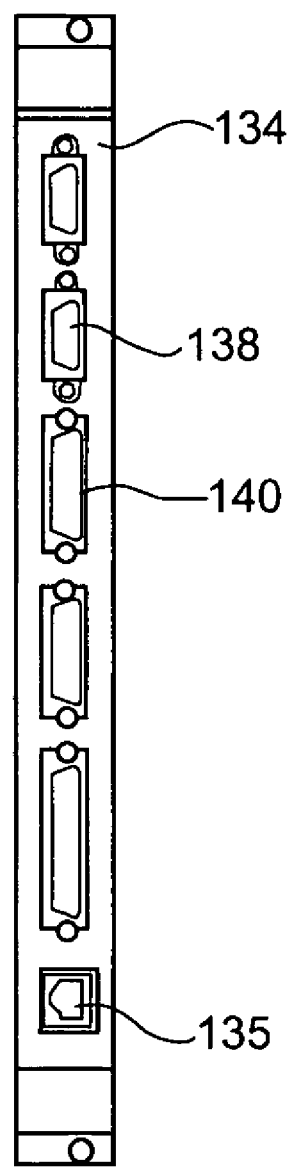
FIGS. 17 and 18 are front and side views of the Transition module for the CPU controller card of FIG. 14.
Figure 18:
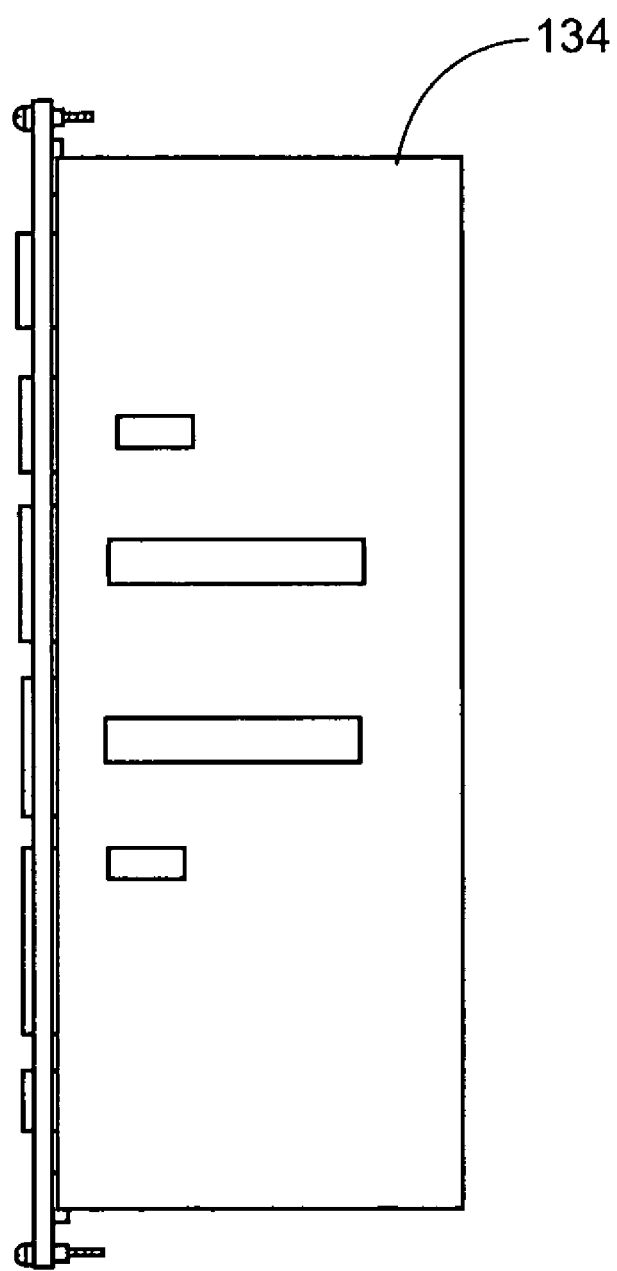

Slot #1 131 as shown in FIGS. 15 and 16, contain CPU/COMM cards such a controller card MVME 2600 available from Motorola®. The CPU/COMM card 131 also includes a transition module 134 that plugs into the card, as shown in FIG. 17. The transition module 134 as shown in FIGS. 17 and 18, has a plurality of serial ports 140 and parallel ports 138 for connecting to various devices, and also a 100 base T connection for connecting to the intranet local area network (LAN) and a remote communication port 135. Using TCP/IP the CPU's can communicate with all of the other components in the system.

In slot 3 of the VME rack 113 is a digital-to-analog converter card 142 as shown in FIGS. 19 and 20. The DAC card 142 preferably includes two DAC circuit cards that perform the necessary transformation of data signals 65 to control signals 68 to provide, for example, position command signals to the servo amplifier 74 or receive position feedback signals from the components 62.

Figure 22:
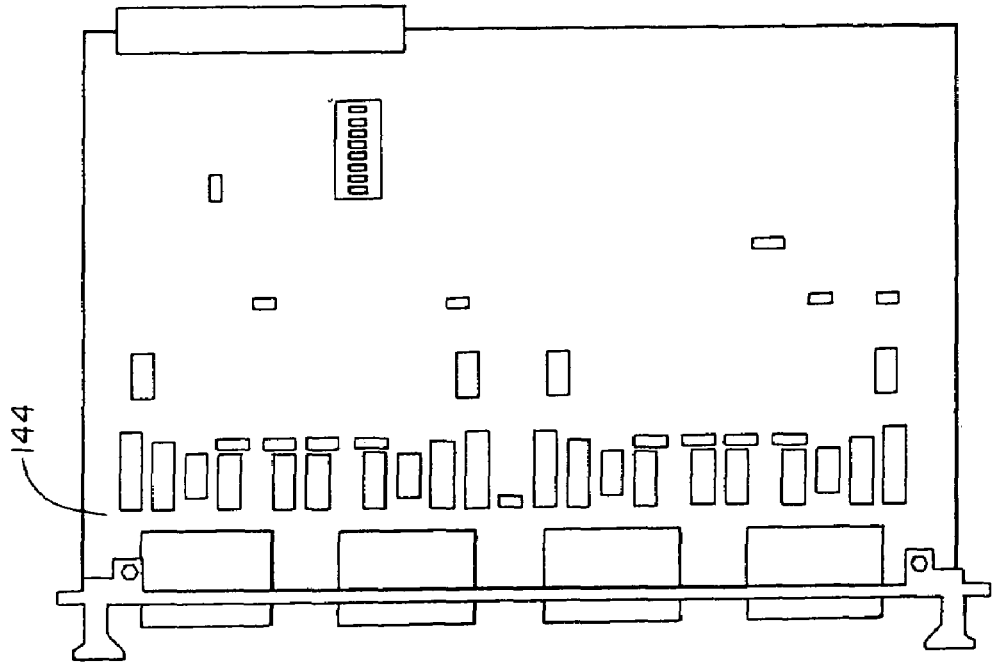
FIGS. 21 and 22 are a front and side view of the I/O port card.
Figure 21:
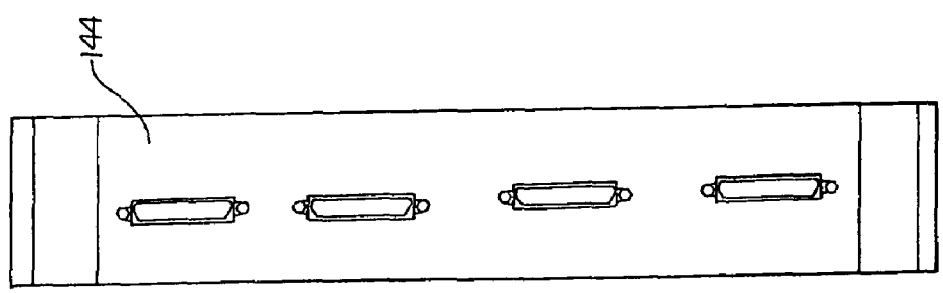
Figure 24:
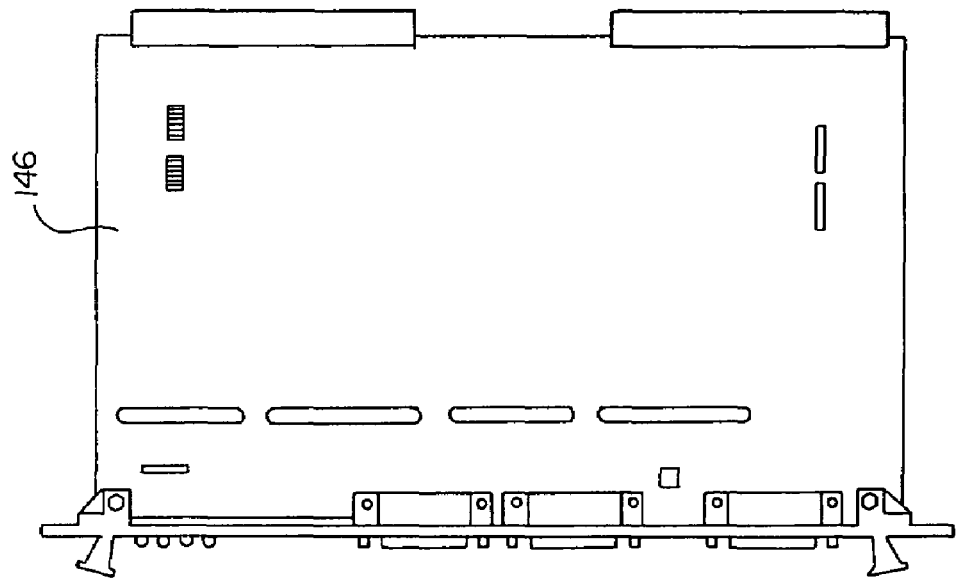
FIGS. 23 and 24 are a front and side view of the bus converter card.
Figure 23:
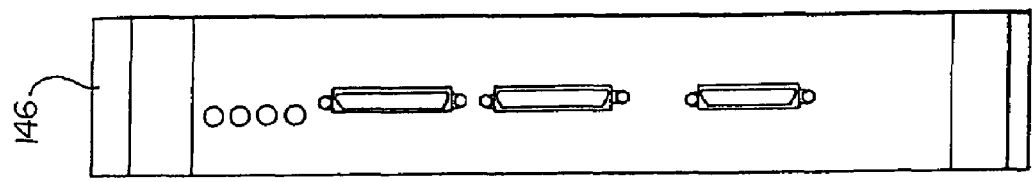

In slot 4 of the VME rack 113 is the Quad Serial I/O ports card 144 to the MIL-STD 1553. Bus 58, as shown in FIGS. 21 and 22. Preferably, the I/O port cards 144 are configurable to operate RS232C, RS422a, RS423 or RS485 ports. In slot 5 of the VME rack 113 is the bus converter card 146, as shown in FIGS. 23 and 24. In this embodiment, the bus converter card 146 converts the MIL-STD 1553. Bus 58 used for the data connections 65 to the VME Bus used within the VME rack 113.

Figure 26:
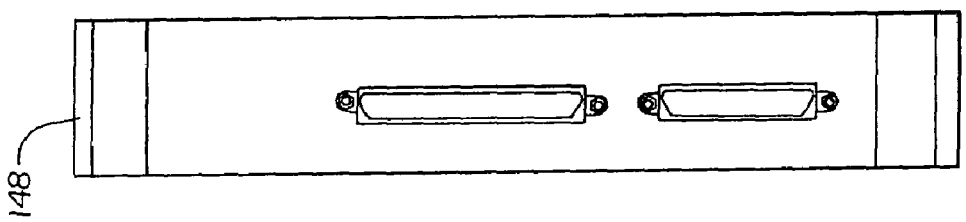
FIGS. 25 and 26 are a front and side view of the Channel Resolver card.
Figure 25:
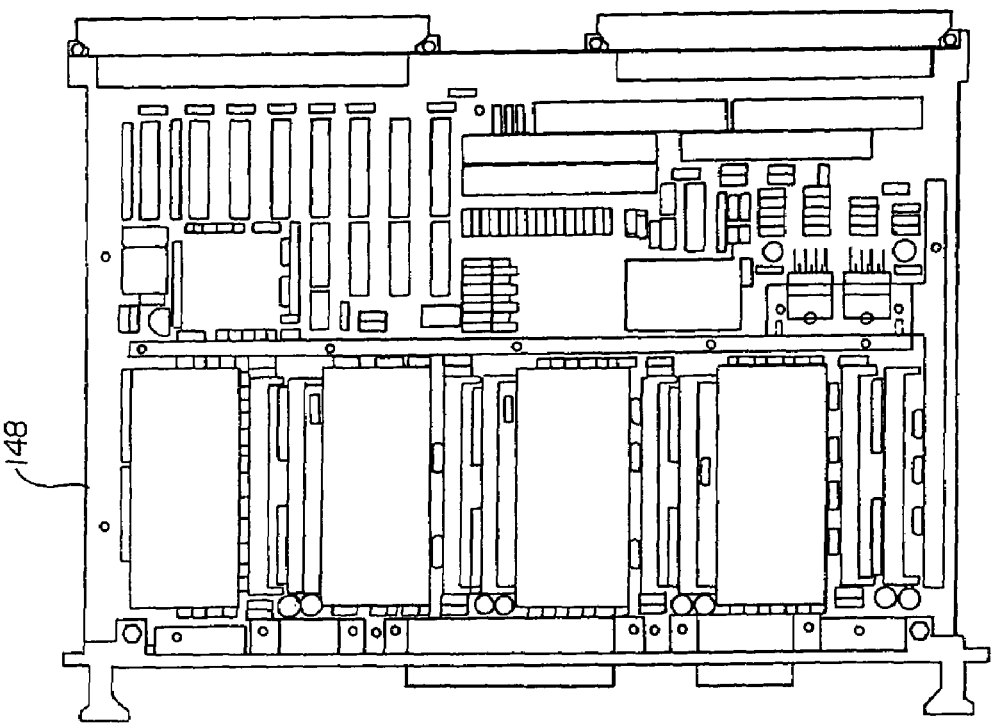
Figure 28:
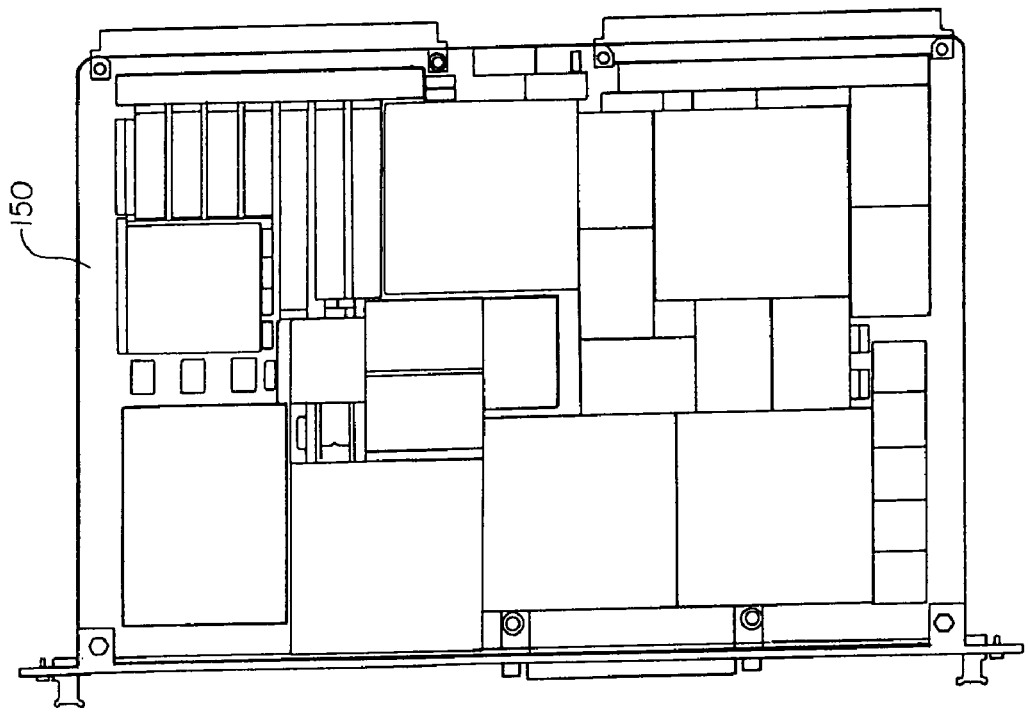
FIGS. 27 and 28 are a front and side view of the Digital to Syncro/Resolver card.
Figure 27:
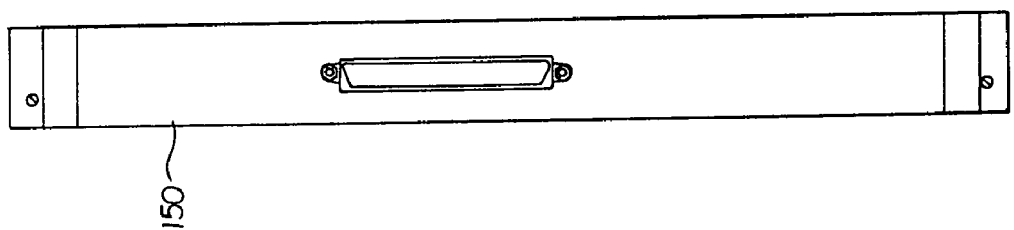

In slot 6 of the VME rack 113 is the Resolver to Digital Card 148, as shown in FIGS. 25 and 26. The resolver is a position sensor for a weaponry component. For example, by measuring the electric signal produced by the stator angle with respect to the commutator of a motor, the resulting electric signal can be measured to determine the position of a maneuvering motor for the armament components. The R-to-D card 148 takes the stator signals from the elevation and train resolvers of a gun controller 80, 82 and converts them to digital, then feeds them to the DAC card 142 for the position feedback signal generation supplying the servo amplifier 74. The R-to-D card 148 also generates a 2.6 KHZ 5 Volt signal to supply the resolver motors. In slot 7 of the VME rack 113 is the Digital to Resolver card 150, as shown in FIGS. 27 and 28. The D-to-R card 150 essentially performs the opposite functions of the R-to-D card 148 by converting appropriate digital signals to the necessary analog levels for supplying control signals to the resolvers.

A portion of the disclosure of this invention is subject to copyright protection. The copyright owner permits the facsimile reproduction of the disclosure of this invention as it appears in the Patent and Trademark Office files or records, but otherwise reserves all copyright rights.

Although the preferred embodiment of the automated system of the present invention has been described, it will be recognized that numerous changes and variations can be made and that the scope of the present invention is to be defined by the claims.

The invention claimed is:

1. A control system architecture for controlling a multi-component armament system connected in a client-server configuration, the control system comprising:
   a plurality of client armament component nodes, each armament component node corresponding to an armament component having at least one operational characteristic and configured as one of a physical armament component and a virtual prototype of said physical armament component;
   at least one client man-machine interface component node;
   at least one client graphical user interface component node;
   at least one real-time controller component configured as a server master node, the real-time controller including a real-time operating system and a virtual/real/both switch, the real-time operating system programmably including a real-time scheduler, and the virtual/real/both switch being configured for dynamically switching between the physical armament component, the virtual prototype of the physical armament component, or both; and
   a multi-tiered network for operably connecting the plurality of the armament component client nodes, the at least one man-machine interface component client node, the at least one graphical user interface component client node, and said at least one server master node in a hierarchical arrangement having a plurality of tiers so as to form an intranet-like network with the nodes communicatively connected in a data connection configuration and a control signal configuration.

2. The control system architecture of claim 1, wherein the real-time scheduler executes a scheduler routine to monitor communications over the intranet-like network to determine whether the communications arrive within predetermined expected time frames.

3. The control system architecture of claim 2, wherein the server master node further includes a profile database storing information associated with each of the plurality of armament components and the at least one graphical user interface that includes the predetermined expected time frames for communications initiated by each of the armament components or the graphical user interface.

4. The control system architecture of claim 1, wherein the intranet-like network includes at least one data communication channel for each of the plurality of tiers and at least one control signal communication channel for at least one of the plurality of tiers.

5. The control system architecture of claim 4, wherein the real-time scheduler routine monitors communications over the intranet-like network on the at least one data communication channel to determine whether the communications arrive within predetermined expected time frames.

6. The control system architecture of claim 5, further comprising a servo amplifier component node operably connected to the real-time controller via the data communication channel and operably connected to the plurality of armament component nodes in a tier separate from the server master node and the servo amplifier component node via the control signal communication channel wherein the servo amplifier system generates amplified control signals for the plurality of armament components.

7. The control system architecture of claim 1, wherein the graphical user interface component node comprises the man-machine-interface and a control computer.

8. The control system architecture of claim 1, wherein the man-machine-interface is selected from the set comprising: a personal digital assistant, a personal computer and an embedded device.

9. The control system architecture of claim 1, wherein the real time controller operates a real time operating system.

10. The control system architecture of claim 1, wherein the virtual prototype is generated by a Simulation-Emulation-Stimulation (SES) process.

11. The control system architecture of claim 10, wherein the Simulation-Emulation-Stimulation process is executed on a computer processor and the Simulation-Emulation-Stimulation process comprises:
providing a set of system requirements;
creating a system simulation;
generating system code; and
downloading the system code into the computer processor.

12. The control system architecture of claim 1 wherein each of the armament component nodes can be implemented as a virtual prototype.

13. The control system architecture of claim 1 wherein each node is associated with a distinct internet protocol (IP) address, the data connection providing for packetized communications over the intranet-like network using a transmission control protocol/internet protocol (TCP/IP) client/server communication scheme utilizing said IP addresses so that data signals can be passed among the nodes within the internet-like network until they arrive at their intended destinations, the control signal configuration allowing for connection between nodes in the intranet-like network for control signal communications other than the data signals among the nodes within the intranet-like network.

14. The control system architecture of claim 1 wherein the virtual/real/both switch comprises software instructions executing in the real-time operating system operative with at least one connection path switch associated with the data connection configuration and the control signal configuration.

15. A control system architecture for controlling a multi-component armament system connected in a client-server configuration, the control system comprising:
a plurality of client armament component nodes, each armament component node corresponding to an armament component having at least one operational characteristic and configured as one of a physical armament component and a virtual prototype of said physical armament component;
at least one client man-machine interface component node;
at least one client graphical user interface component node;
at least one servo amplifier component node;
at least one real-time controller component configured as a server master node, the real-time controller including a real-time operating system and a virtual/real/both switch, wherein the virtual/real/both switch is configured for dynamically switching between the physical armament component, the virtual prototype of the physical armament component, or both;
a multi-tiered network operably connected to the plurality of the armament component client nodes, the at least one man-machine interface component client node, the at least one graphical user interface component client node, and said at least one server master node in a hierarchical arrangement having a plurality of tiers so as to form an intranet-like network with the nodes communicatively connected in a data connection configuration and a control signal configuration wherein the server master node is equipped with a profile database storing information associated with each of the plurality of client armament component nodes and the at least one client graphical user interface component node, the profile database storing predetermined expected time frames for communications initiated by each one of the armament components or the graphical user interface to be received by each of the other of said armament components or the graphical user interface, the real-time operating system programmably including a real-time scheduler that executes a scheduler routine configured to monitor communications over the intranet-like network to determine whether the communications arrive within predetermined expected time frames, and wherein the servo amplifier component node is operably connected to the real-time controller via the data communication channel and operably connected to the plurality of armament component nodes in a tier separate from the server master node and the servo amplifier component node via the control signal communication channel, the servo amplifier system being effective to generate amplified control signals for the plurality of armament components.

16. The control system architecture of claim 15 wherein each node is associated with a distinct internet protocol (IP) address, the data connection providing for packetized communications over the intranet-like network using a transmission control protocol/internet protocol (TCP/IP) client/server communication scheme utilizing said IP addresses so that data signals can be passed among the nodes within the intranet-like network until they arrive at their intended destinations, the control signal configuration allowing for connection between nodes in the intranet-like network for control signal communications other than the data signals among the nodes within the intranet-like network.

17. The control system architecture of claim 15 wherein the virtual/real/both switch comprises software instructions executing in the real-time operating system operative with at least one connection path switch associated with the data connection configuration and the control signal configuration.

* * * * *